US012646445B2

(12) United States Patent
Lin et al.

(10) Patent No.: US 12,646,445 B2
(45) Date of Patent: Jun. 2, 2026

(54) DRIVING METHOD FOR PIXEL CIRCUITS BASED ON MAPPING TECHNIQUE AND DISPLAY DEVICE USING SAME

(71) Applicant: AUO Corporation, Hsinchu City (TW)

(72) Inventors: Shin-Ru Lin, Hsinchu City (TW); Ya-Ling Chen, Hsinchu City (TW); Chun-Yu Chen, Hsinchu City (TW); Yung-Chih Chen, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/922,473

(22) Filed: Oct. 22, 2024

(65) Prior Publication Data

US 2025/0209972 A1 Jun. 26, 2025

(30) Foreign Application Priority Data

Dec. 25, 2023 (TW) ................................ 112150647

(51) Int. Cl.
*G09G 3/32* (2016.01)
*G09G 3/20* (2006.01)
*G09G 3/3233* (2016.01)

(52) U.S. Cl.
CPC ............ *G09G 3/32* (2013.01); *G09G 3/2011* (2013.01); *G09G 3/2018* (2013.01); *G09G 3/2074* (2013.01); *G09G 3/2077* (2013.01); *G09G 3/3233* (2013.01); *G09G 2300/0452* (2013.01); *G09G 2300/0842* (2013.01); *G09G 2300/0861* (2013.01); *G09G 2310/08* (2013.01); *G09G 2330/021* (2013.01); *G09G 2360/16* (2013.01)

(58) Field of Classification Search
CPC ........................................................ G09G 3/32
See application file for complete search history.

(56) References Cited

U.S. PATENT DOCUMENTS

| | | | | |
|---|---|---|---|---|
| 2010/0118063 | A1* | 5/2010 | Kim | G09G 3/342 345/99 |
| 2014/0132646 | A1* | 5/2014 | Aoki | G09G 3/3233 345/691 |
| 2018/0180941 | A1* | 6/2018 | Zhang | G02F 1/133602 |
| 2021/0327331 | A1* | 10/2021 | Zhang | G09G 3/3208 |
| 2024/0096278 | A1 | 3/2024 | Zhao | |
| 2024/0379041 | A1* | 11/2024 | Huang | G09G 3/32 |

FOREIGN PATENT DOCUMENTS

| | | | |
|---|---|---|---|
| CN | 201315148 | Y | 9/2009 |
| CN | 102298908 | A | 12/2011 |
| TW | 1834473 | B | 3/2024 |

* cited by examiner

*Primary Examiner* — William Boddie
*Assistant Examiner* — Andrew B Schnirel
(74) *Attorney, Agent, or Firm* — WPAT, PC

(57) ABSTRACT

A driving method includes the following steps. An input image is divided into a plurality of image blocks. A plurality of pixel groups corresponding to the image blocks are respectively controlled. Step of controlling a corresponding one of the pixel groups corresponding to one of the image blocks includes the following steps. A plurality of input grayscale values included in one of the image blocks are mapped to a plurality of duty cycles. One of the duty cycles is determined as a desired duty cycle. A plurality of the input grayscale values are mapped to a plurality of data voltages according to the desired duty cycle. A plurality of pixel circuits included in the one of the pixel groups are driven according to the desired duty cycle and the data voltages.

11 Claims, 19 Drawing Sheets

DRIVING METHOD FOR PIXEL CIRCUITS BASED ON MAPPING TECHNIQUE AND DISPLAY DEVICE USING SAME

CROSS-REFERENCE TO RELATED APPLICATION

This application claims priority to Taiwan Application Serial Number 112150647, filed Dec. 25, 2023, which is herein incorporated by reference in its entirety.

BACKGROUND

Field of Invention

The present invention relates to a driving method. More particularly, the present invention relates to a driving method capable for driving a display device.

Description of Related Art

In some display techniques, an illumination for each pixel is controlled based on pulse amplitude modulation techniques and an adjustment of a duty cycle of a global emission control signal to reduce the power consumption.

However, even if a background often shows an image at low grayscale levels, the duty cycle of the global emission control signal is still required to be maintained at a high duty ratio to display few elements which are shown at high grayscale levels, and it may cause that light emitting elements displaying the background continue to operate at low efficiency points.

Take a wearable watch as an example, if a background is at medium to low grayscale levels while a pointer is at high grayscale levels, the duty cycle of the global emission control signal cannot be adjusted to the low duty cycle because of the pointer being at high grayscale levels, causing that the light emitting elements continue to operate at the low efficiency point, leading to a decrease in the overall efficiency, and the power consumption may become less competitive.

Therefore, how to provide a driving method to solve the above problems is an important issue in this field.

SUMMARY

The present disclosure provides a driving method. The driving method includes the following steps. An input image is divided into a plurality of image blocks. A plurality of pixel groups corresponding to the image blocks are controlled, respectively. The step of controlling a corresponding one of the pixel groups includes the following steps. A plurality of input grayscale values comprised in the one of the image blocks are mapped to a plurality of duty cycles. One of the duty cycles is determined as a desired duty cycle. A plurality of the input grayscale values is mapped to a plurality of data voltages according to the desired duty cycle. A plurality of pixel circuits included in the corresponding one of the pixel groups are driven according to the desired duty cycle and the data voltages.

The present disclosure provides a display device. The driving method includes a memory, a processing circuit and a display panel. The memory is configured to store data and instructions. The processing circuit is coupled to the memory to access the data and instructions to perform following steps. An input image is divided into a plurality of image blocks. A plurality of pixel groups corresponding to the image blocks are controlled, respectively. The step of controlling a corresponding one of the pixel groups includes the following steps. A plurality of input grayscale values comprised in the one of the image blocks are mapped to a plurality of duty cycles. One of the duty cycles is determined as a desired duty cycle. A plurality of the input grayscale values is mapped to a plurality of data voltages according to the desired duty cycle. The display panel is coupled to the processing circuit, configured to drive a plurality of pixel circuits included in the corresponding one of the pixel groups according to the desired duty cycle and the data voltages.

Summary, the driving method of the present disclosure performing grouping on the pixel circuits, thereby driving the pixel circuits included in the same pixel group based on the same desired duty cycle, where the said desired duty cycle is obtained according to an image block corresponding to the pixel group, in order to achieve the group control for the pixel circuits, as such light emitting elements included in the most of the pixel groups can operate at the better efficiency points.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1B:
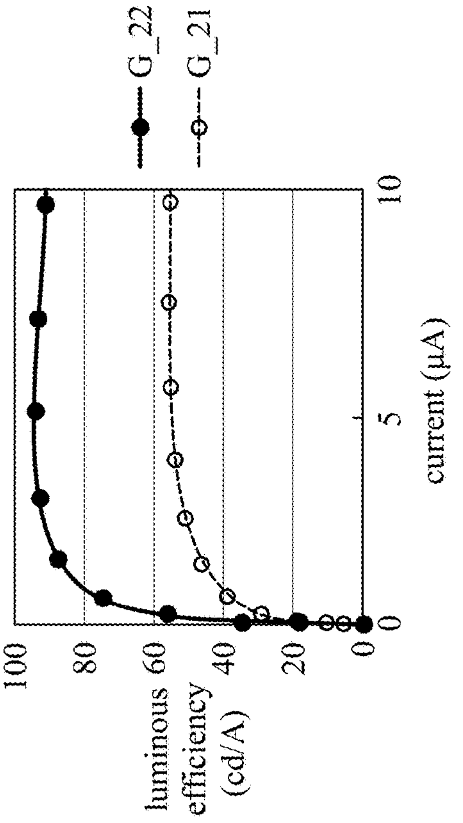
FIG. 1B depicts a schematic diagram of curves for luminous efficiencies of green light emitting diodes which have different item numbers according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms "comprise" or "comprising," "include" or "including," "have" or "having," "contain" or "containing" and the like used herein are to be understood to be open-ended, i.e., to mean including but not limited to.

Figure 1A:
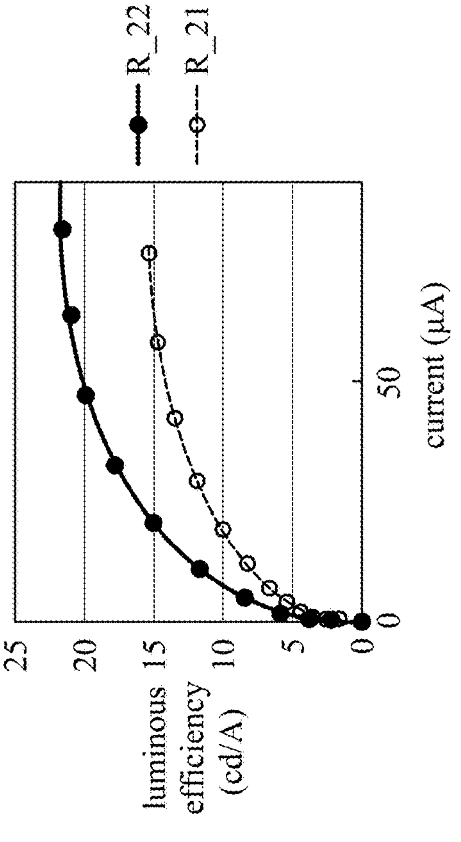
FIG. 1A depicts a schematic diagram of curves for luminous efficiencies of red light emitting diodes which have different item numbers according to some embodiments of the present disclosure.
Figure 1C:
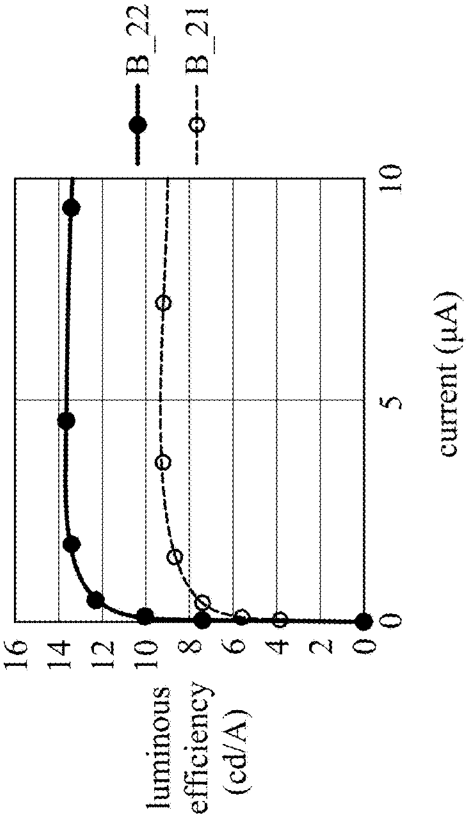
FIG. 1C depicts a schematic diagram of curves for luminous efficiencies of blue light emitting diodes which have different item numbers according to some embodiments of the present disclosure.

A description is provided with reference to FIG. 1A, FIG. 1B and FIG. 1C. FIG. 1A depicts a schematic diagram of curves R_21~R_22 for luminous efficiency of red light emitting diodes which have different item numbers according to some embodiments of the present disclosure. FIG. 1B depicts a schematic diagram of curves G_21~G_22 for luminous efficiencies of green light emitting diodes which have different item numbers according to some embodiments of the present disclosure. FIG. 1C depicts a schematic diagram of curves B_21~B_22 for luminous efficiencies of blue light emitting diodes which have different item numbers according to some embodiments of the present disclosure. As shown in FIG. 1A to FIG. 1C, when the amplitude of a current for driving a red, a green or a blue light emitting element is greater, the luminous efficiency is better. However, under conditions of medium to low grayscale levels, the amplitude of the driving current is hard to achieve the best luminous efficiency for the red, the green or the blue light emitting element. Specifically, a description is provided with reference to FIG. 2A, FIG. 2B and FIG. 2C.

Figure 2B:
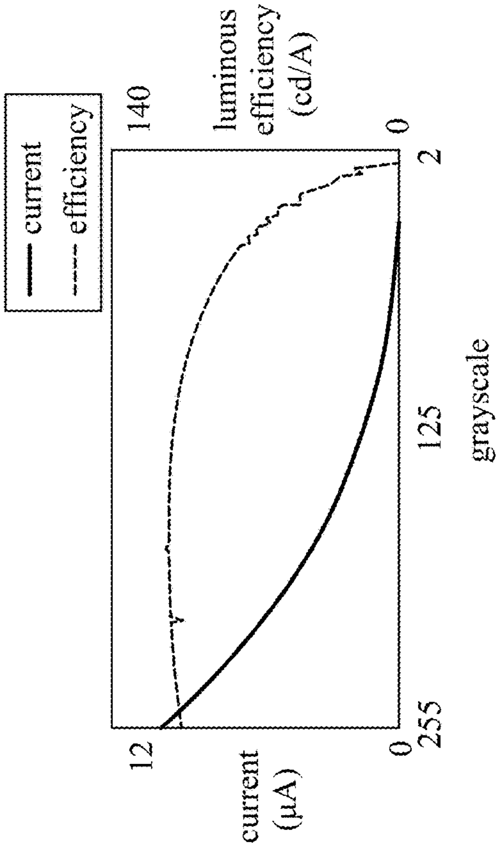
FIG. 2B depicts a schematic diagram of luminous efficiencies of green light emitting diodes with respect to different grayscale levels according to some embodiments of the present disclosure.
Figure 2A:
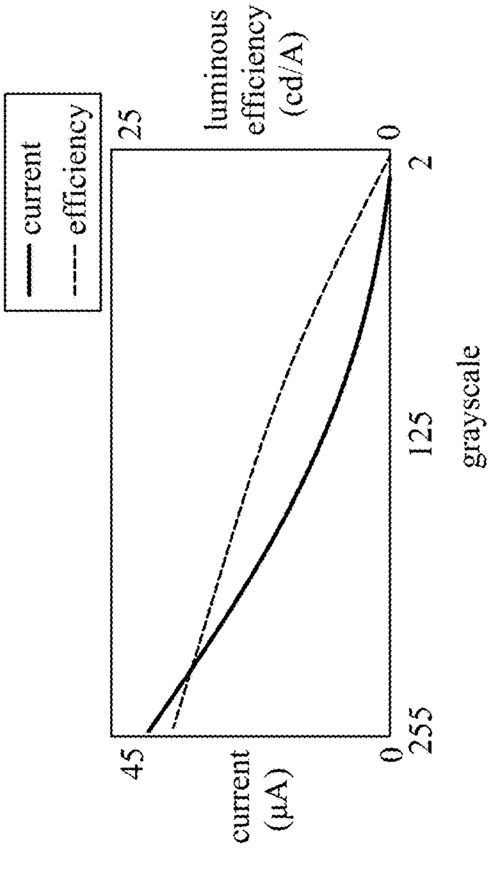
FIG. 2A depicts a schematic diagram of luminous efficiencies of red light emitting diodes with respect to different grayscale levels according to some embodiments of the present disclosure.
Figure 2C:
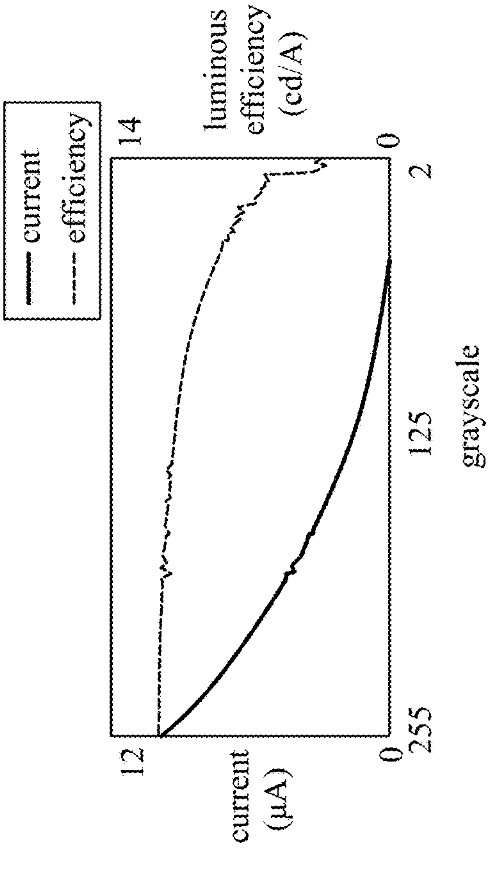
FIG. 2C depicts a schematic diagram of luminous efficiencies of blue light emitting diodes with respect to different grayscale levels according to some embodiments of the present disclosure.

FIG. 2A depicts a schematic diagram of luminous efficiencies of red light emitting diodes with respect to different grayscale levels according to some embodiments of the present disclosure. FIG. 2B depicts a schematic diagram of luminous efficiencies of green light emitting diodes with respect to different grayscale levels according to some embodiments of the present disclosure. FIG. 2C depicts a schematic diagram of luminous efficiencies of blue light emitting diodes with respect to different grayscale levels according to some embodiments of the present disclosure. As shown in FIG. 2A to FIG. 2C, under conditions of medium to low grayscale levels, the amplitudes of the driving currents provided to the red, the green and the blue light emitting elements are quite small, it cause that the efficiency is greatly reduced. Therefore, how to slow the above problems may describe in detailed in the following embodiments of the present disclosure.

Figure 3A:
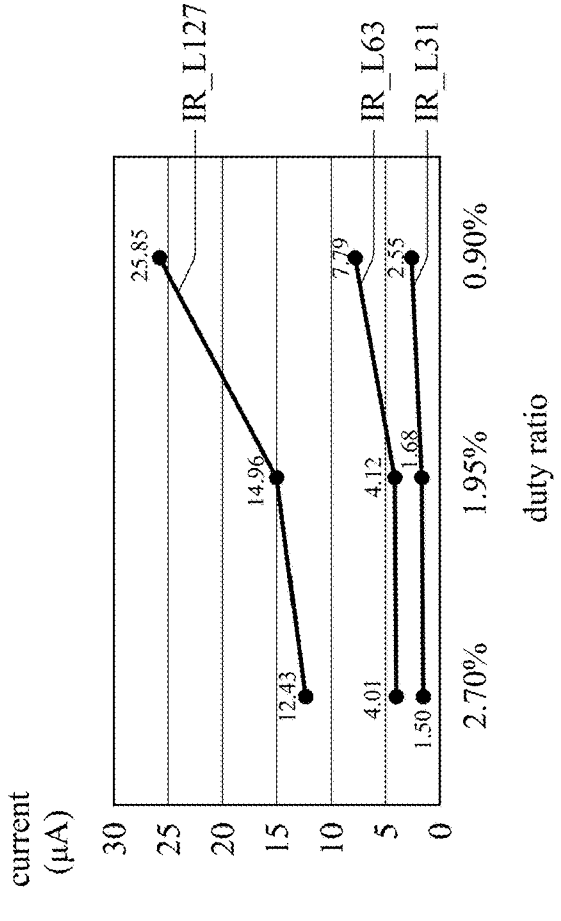
FIG. 3A depicts a schematic diagram of curves for currents provided to red light emitting diodes with respect to some duty ratios according to some embodiments of the present disclosure.
Figure 3B:
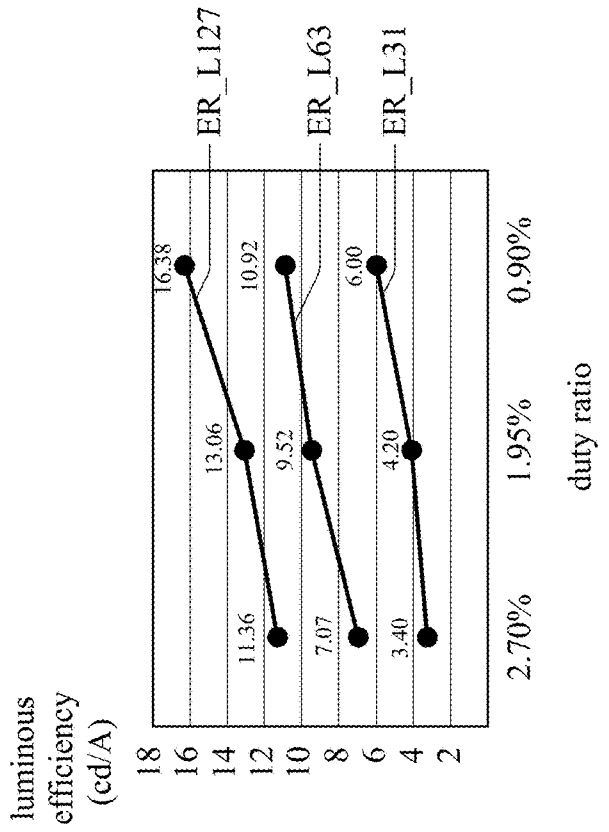
FIG. 3B depicts a schematic diagram of curves for luminous efficiencies of red light emitting diodes with respect to some duty ratios according to some embodiments of the present disclosure.

A description is provided with reference to FIG. 3A and FIG. 3B. FIG. 3A depicts a schematic diagram of curves IR_L127, IR_L63 and IR_L31 for currents provided to red light emitting diodes with respect to some duty ratios according to some embodiments of the present disclosure. FIG. 3B depicts a schematic diagram of curves ER_L127, ER_L63 and ER_L31 for luminous efficiencies of red light emitting diodes with respect to some duty ratios according to some embodiments of the present disclosure. As shown in FIG. 3A and FIG. 3B, under conditions of a range of grayscale levels between 0~255, whether the grayscale level of the red light emitting diode is set at 31, 63 or 127, the luminous efficiency is greater when the amplitude of the driving current is greater and the duty ratio is smaller. That is, the efficiency of the red light emitting diode has a linearly relationship with the duty ratio. Therefore, for the red light emitting diode, the small the duty ratio of the driving current is, the more power can be saved, and it is unable to meet a best efficiency point.

Figure 4A:
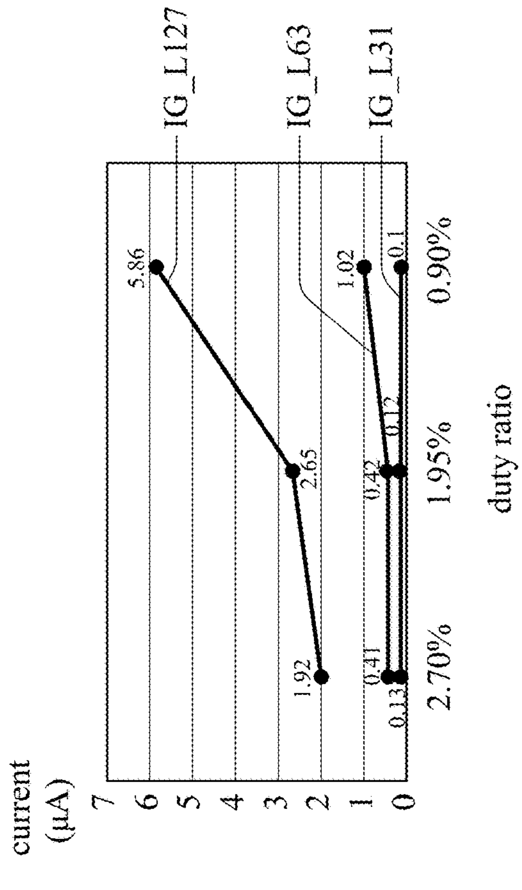
FIG. 4A depicts a schematic diagram of curves for currents provided to red light emitting diodes green light emitting diodes with respect to some duty ratios according to some embodiments of the present disclosure.
Figure 4B:
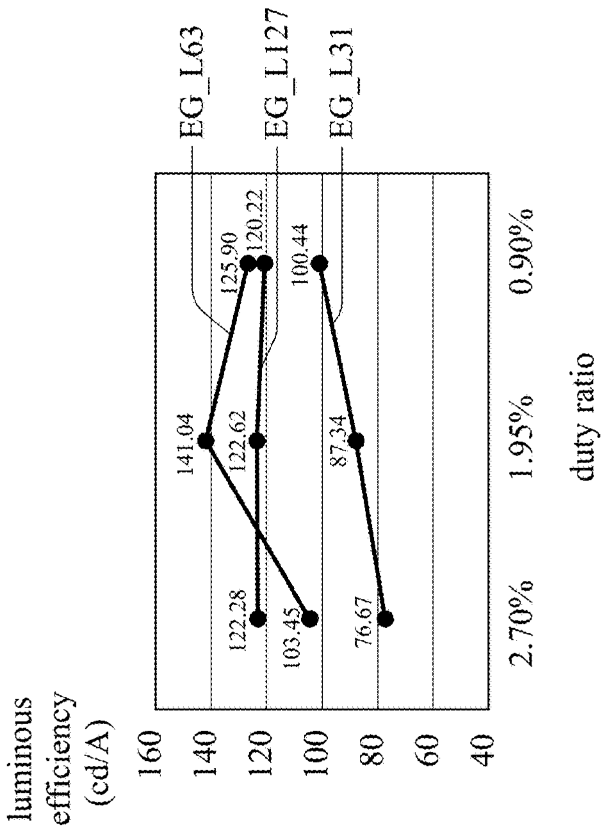
FIG. 4B depicts a schematic diagram of curves for luminous efficiencies of green light emitting diodes with respect to some duty ratios according to some embodiments of the present disclosure.

A description is provided with reference to FIG. 4A and FIG. 4B. FIG. 4A depicts a schematic diagram of curves IG_L127, IG_L63 and IG_L31 for currents provided to red light emitting diodes green light emitting diodes with respect to some duty ratios according to some embodiments of the present disclosure. FIG. 4B depicts a schematic diagram of curves EG_L127, EG_L63 and EG_L31 for luminous efficiencies of green light emitting diodes with respect to some duty ratios according to some embodiments of the present disclosure. As shown in FIG. 4A and FIG. 4B, under conditions of a range of the grayscale levels between 0~255, if a grayscale level of the green light emitting diode is set at 31 or 127, the luminous efficiency is greater when the amplitude of the driving current is greater and the duty ratio is smaller. If a grayscale level of the green light emitting diode is set at 63, the luminous efficiency of the green light emitting diode changes from small to large and then changes to small when the amplitude of the driving current is greater and the duty ratio is smaller. That is, the efficiency and the duty ratio of the green light emitting diode are not are not positively related, and therefore the best current critic point of the green light emitting diode can be found based on the experiments.

Figure 5A:
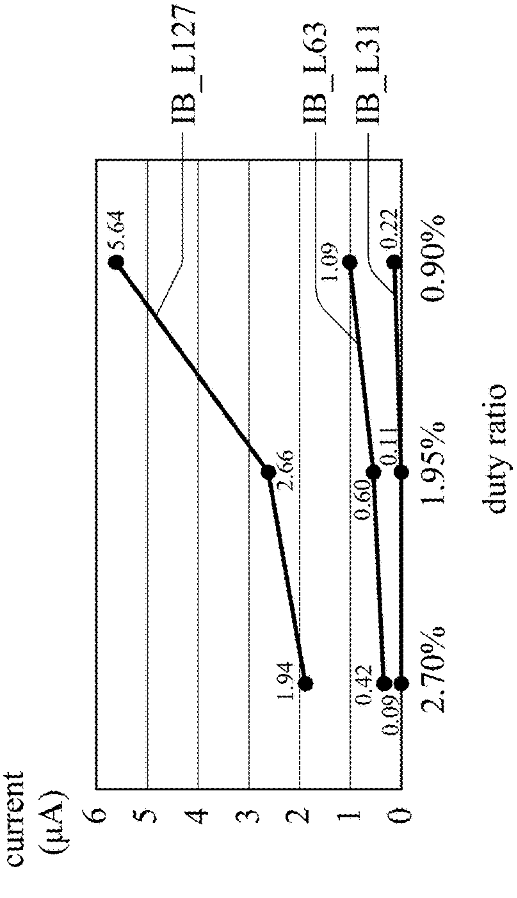
FIG. 5A depicts a schematic diagram of curves for currents provided to red light emitting diodes blue light emitting diodes with respect to some duty ratios according to some embodiments of the present disclosure.
Figure 5B:
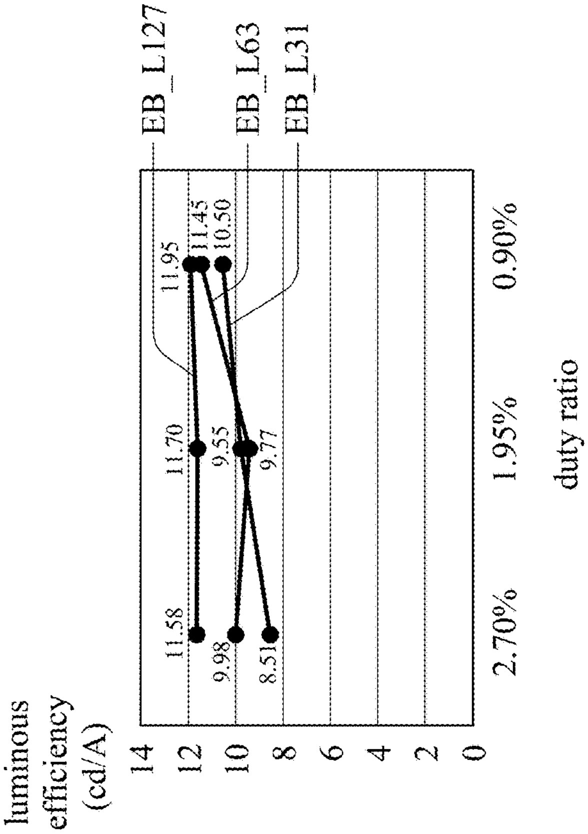
FIG. 5B depicts a schematic diagram of curves for luminous efficiencies of blue light emitting diodes with respect to some duty ratios according to some embodiments of the present disclosure.

A description is provided with reference to FIG. 5A and FIG. 5B. FIG. 5A depicts a schematic diagram of curves IB_L127, IB_L63 and IB_L31 for currents provided to red light emitting diodes blue light emitting diodes with respect to some duty ratios according to some embodiments of the present disclosure. FIG. 5B depicts a schematic diagram of curves EB_L127, EB_L63 and EB_L31 for luminous efficiencies of blue light emitting diodes with respect to some duty ratios according to some embodiments of the present disclosure. As shown in FIG. 5A an FIG. 5B, under conditions of a range of grayscale levels between 0~255, if a grayscale level of the blue light emitting diode is set at 31, the luminous efficiency is greater when the amplitude of the driving current is greater and the duty ratio is smaller. If a grayscale level of the blue light emitting diode is set at 63, the luminous efficiency changes from small to larger and then changes to small when the amplitude of the driving current is greater and the duty ratio is smaller. If a grayscale level of the blue light emitting diode is set at 127, the luminous efficiency changes from small to larger and then changes to small when the amplitude of the driving current is gradually decreased. That is, the efficiency and the duty ratio of the blue light emitting diode are not are not positively related, and therefore the best current critic point of the blue light emitting diode can be found based on the experiments.

Figure 6:
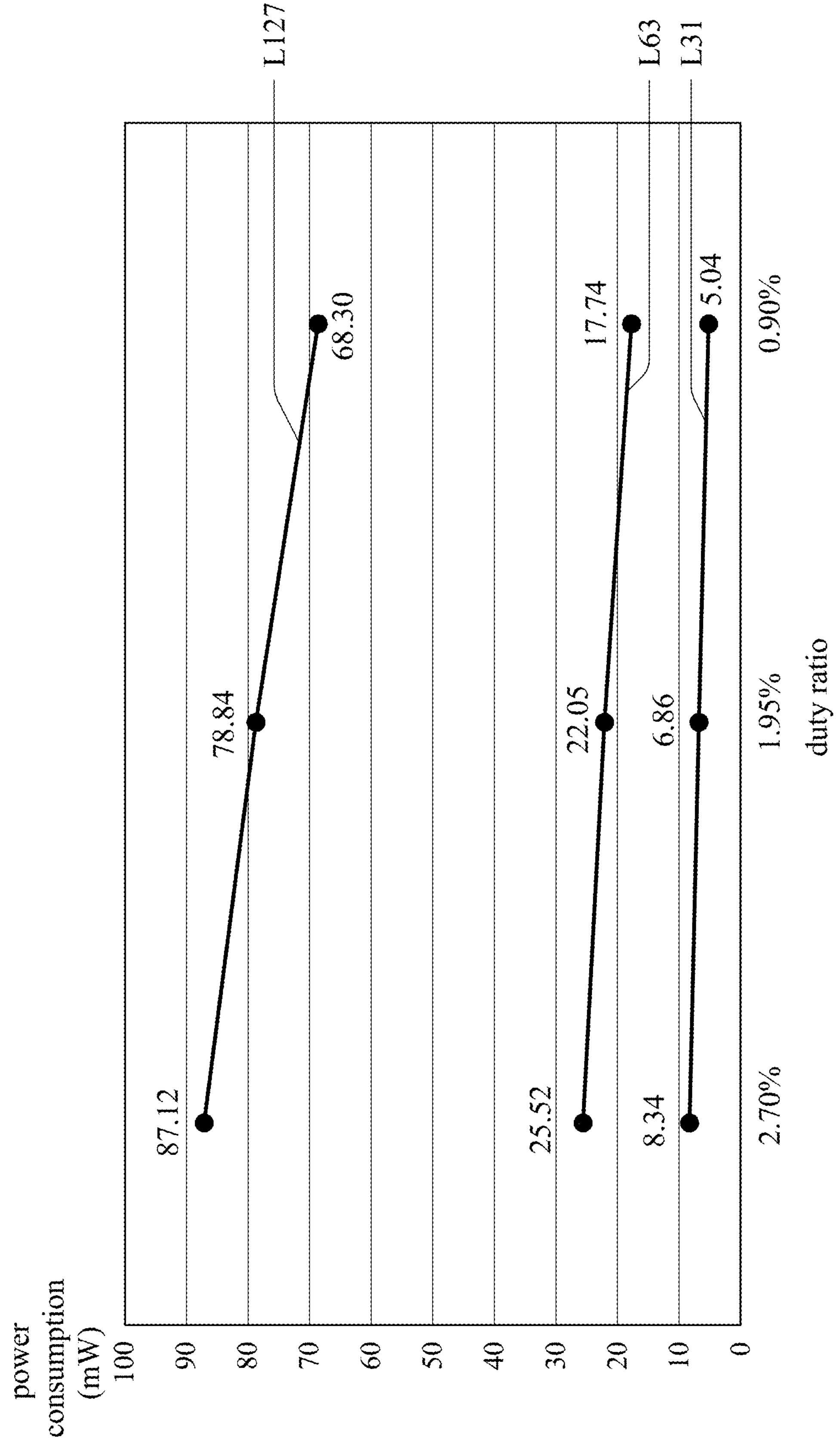
FIG. 6 depicts a schematic diagram of curves for overall power consumptions of a display panel according to some embodiments of the present disclosure.

A description is provided with reference to FIG. 6. FIG. 6 depicts a schematic diagram of curves L31, L63 and L127 for overall power consumptions of a display panel according to some embodiments of the present disclosure. As shown in FIG. 6, whether a grayscale level is set at 31, 63 or 127, if a duty ratio of a driving current provided to light emitting elements included in a display panel is smaller, the power consumption is reduced. Therefore, by decreasing the duty ratio of the driving current and correspondingly increasing the pulse amplitude of the driving current, the power consumption can be exactly reduced.

Figure 7A:
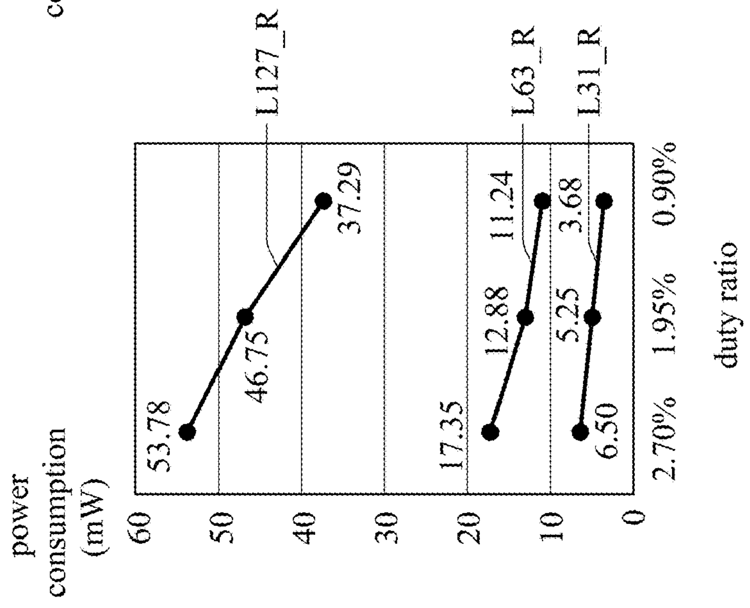
FIG. 7A depicts a schematic diagram of curves for overall power consumptions of red light emitting diodes included in a display panel according to some embodiments of the present disclosure.
Figure 7B:
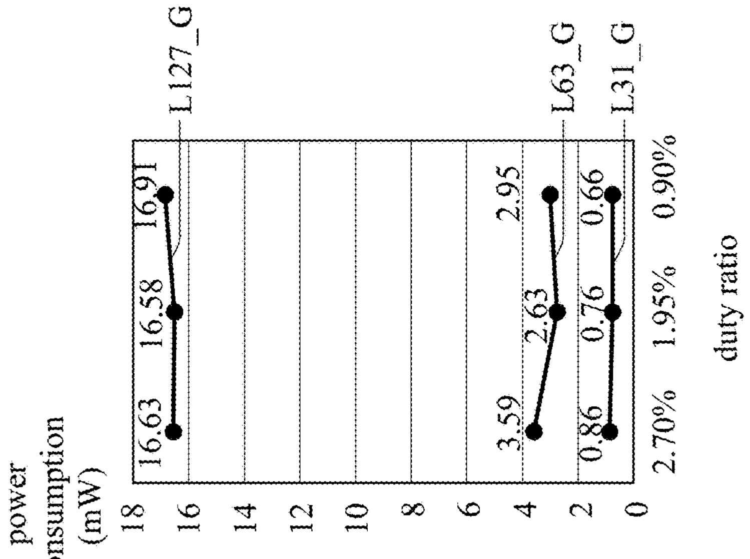
FIG. 7B depicts a schematic diagram of curves for overall power consumptions of green light emitting diodes included in a display panel according to some embodiments of the present disclosure.
Figure 7C:
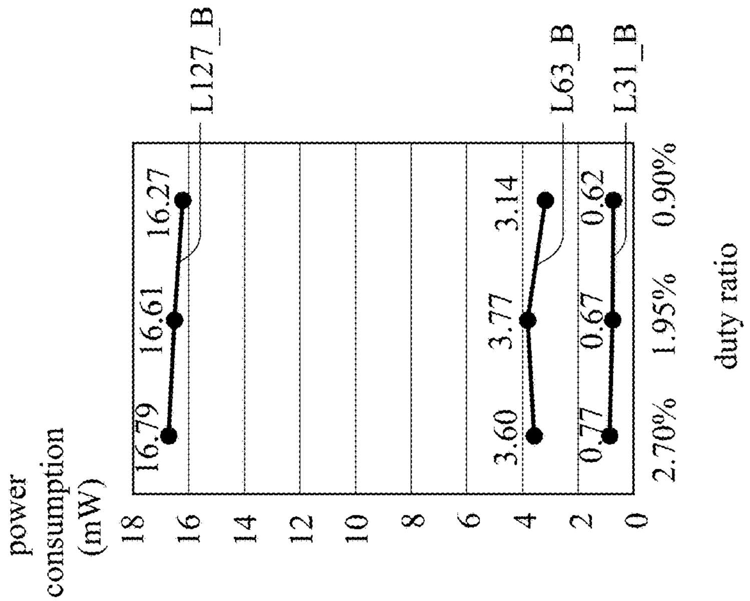
FIG. 7C depicts a schematic diagram of curves for overall power consumptions of blue light emitting diodes included in a display panel according to some embodiments of the present disclosure.

A description is provided with reference to FIG. 7A to FIG. 7C. FIG. 7A depicts a schematic diagram of curves L31_R, L63_R and L127_R for overall power consumptions of red light emitting diodes included in a display panel according to some embodiments of the present disclosure. FIG. 7B depicts a schematic diagram of curves L31_G, L63_G and L127_G for overall power consumptions of green light emitting diodes included in a display panel according to some embodiments of the present disclosure. FIG. 7C depicts a schematic diagram of curves L31_B, L63_B and L127_B for overall power consumptions of blue light emitting diodes included in a display panel according to some embodiments of the present disclosure. As shown in FIG. 7A, when the duty ratio of the driving current provided to the red light emitting diode is smaller, the power consumption is greatly reduced. As shown in FIG. 7B, when the driving current of the green light emitting diode has a certain duty ratio, the power consumption is smaller. As shown in FIG. 7C, when the duty ratio of the driving current provided to the red light emitting diode is smaller, the power consumption is smaller. For better illustrates the power consumptions that can be reduced under different images of the display panel in a configuration for the adjusted duty ratio, a description is provided with the following Table 1.

TABLE 1

| decrease in power (%) | red image | green image | blue image | white image |
|---|---|---|---|---|
| grayscale level of 127 | ↓31% | ↑1.7% | ↓3% | ↓21.6% |
| grayscale level of 63 | ↓35% | ↓17.2% | ↓13.5% | ↓30.5% |
| grayscale level of 31 | ↓43% | ↓23% | ↓21.6% | ↓39.6% |

As shown in FIG. 1, in the configuration for the adjusted duty ratio, the power consumptions that can be reduced under different images of the display panel are greatly increased, exactly. Therefore, how to control the duty cycle of the pixel to achieve the better luminous efficiency will be described in detailed in the following embodiments.

Figure 8A:
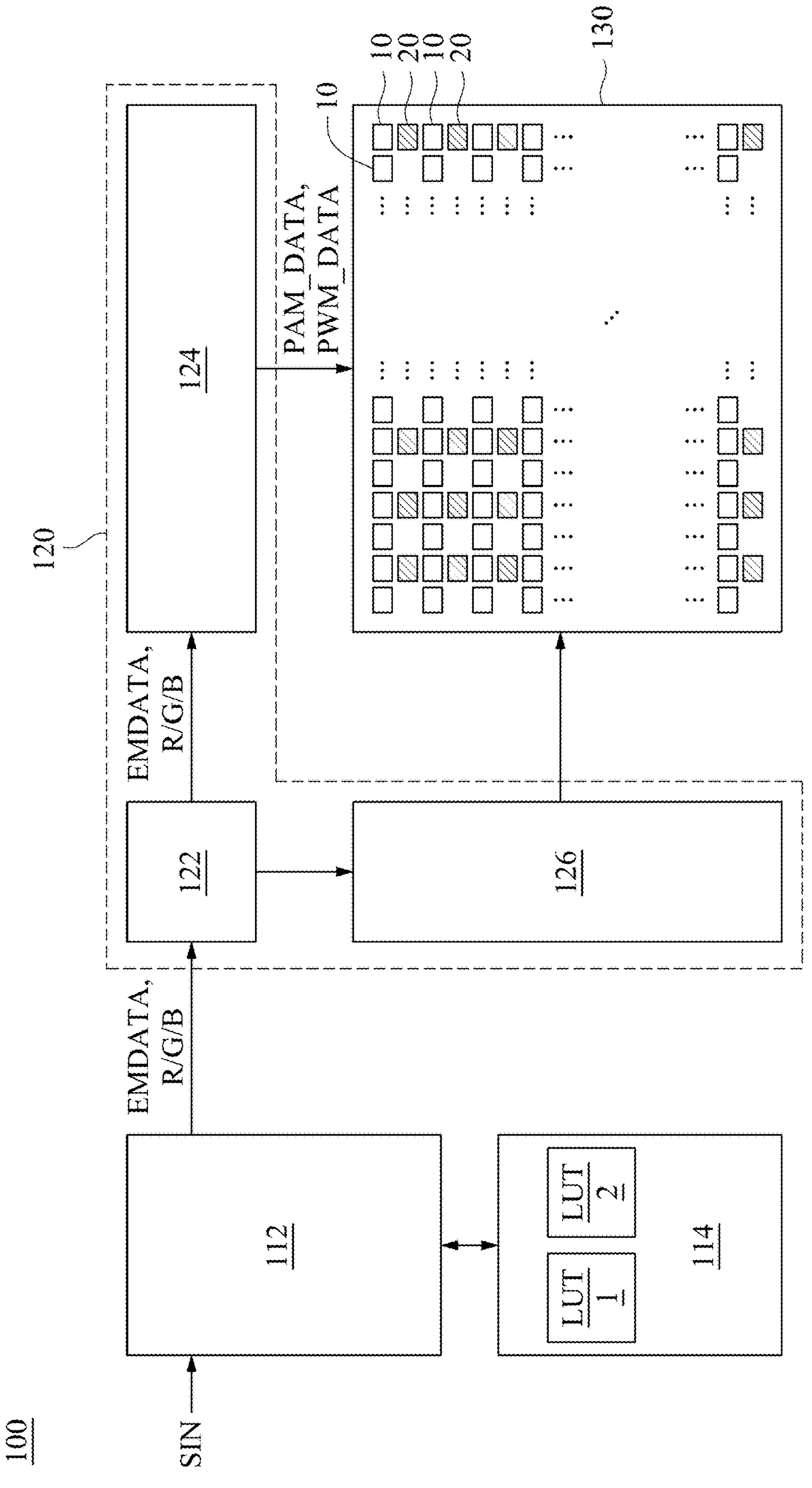
FIG. 8A depicts a schematic diagram of a display device according to some embodiments of the present disclosure.

A description is provided with reference to FIG. 8A. FIG. 8A depicts a schematic diagram of a display device 100 according to some embodiments of the present disclosure. In some embodiments, the display device 100 is configured to receive an input image SIN, and the display device 100 is configured to divide the input image SIN into multiple image blocks, thereby controlling the duty cycles of the corresponding pixels according to the grayscale data in the image blocks, as such the light emitting elements in the pixels operates at the better efficiency points.

As shown in FIG. 8A, the display device 100 includes a processing circuit 112, a memory 114, a driving circuit 120 and a display panel 130.

In some embodiments, the memory 114 is configured to store lookup tables LUT1 and LUT2, which can be accessed by the processing circuit 112. In some embodiments, the input grayscale values for the sub-pixels are mapped through the lookup table LUT1 to the duty cycles. That is, input values of the lookup table LUT1 are grayscale values, and output values of the lookup table LUT1 are duty cycles. In some embodiments, the input grayscale values are mapped through the lookup table LUT2 to data voltages, according to a desired duty cycle. That is, input values of the lookup table LUT2 are grayscale values, and output values of the lookup table LUT2 are data voltages.

In some embodiments, the processing circuit 112 is electrically connected to the memory 114, and the processing circuit 112 is configured to access data and/or instructions stored in the memory 114. In some embodiments, the processing circuit 112 calculates emission control data EMDATA for each pixel group and the data voltages R/G/B for all the pixels according to the input image SIN. In some embodiments, the emission control data EMDATA includes information of desired duty cycles which are used to control pixel groups, and the data voltages R/G/B includes the data voltages which are respectively provided to the pixels in the display panel 130. In some embodiments, the processing circuit 112 is configured to receive an input image SIN, and divide the input image SIN into multiple image blocks, thereby mapping multiple input grayscale values included in an image block through the lookup table LUT1 to multiple duty cycles, in order to determine a desired duty cycle for a corresponding pixel group from the said duty cycles. Further, the lookup table LUT2 is utilized to obtain the data voltages for the corresponding pixels according to the said desired duty cycle. Therefore, the processing circuit 112 utilizes the lookup table LUT2 to obtain the data voltages R/G/B for all of the pixels according to the desired duty cycles of each pixel group.

In some embodiments, the driving circuit 120 includes a timing controller 122, a source driver 124 and a gate driving circuit 126. In some embodiments, the timing controller 122 converts data formats of the emission control data EMDATA and the data voltages R/G/B to comply with the data format of the source driver 124, and transmit the emission control data EMDATA and the data voltages R/G/B to the source driver 124. In some embodiments, the source driver 124 generates data signals PWM_DATA according to the emission control data EMDATA, and the source driver 124 generates data signals PAM_DATA according to the data voltages R/G/B. In some embodiments, the data signals PWM_DATA are to control the pulse widths of the driving currents flowing through the light emitting elements, and the data signals PAM_DATA are to control the pulse amplitudes of the driving currents flowing through the light emitting elements.

In some embodiments, the display panel 130 includes pixels 10 arranged in an array, and emission control circuits 20 disposed in a remaining area between pixel rows. In some embodiments, the emission control circuit 20 id configured to generate and provide emission control signals, according to the data signals PWM_DATA, to the corresponding pixels 10, in order to control duty cycles of the corresponding pixels 10, as such the pixels 10 are able to operate in better efficiency.

In some embodiments, the memory 114 can be implemented by an electrical memory device, a magnetic memory device, an optical memory device or other storage devices that capable for storing instructions or data. In some embodiments, the memory 114 may be implemented by a volatile memory or a non-volatile memory. In some embodiments, the memory 114 can be implemented by a random access memory (RAM), a dynamic random access memory (DRAM), a magneto-resistive random access memory (MRAM), a phase-change random access memory (PCRAM) or other storage devices.

In some embodiments, the processing circuit 112 is selected from a group of a central processing unit, a graphics processor, a microprocessor, a field-programmable gate array integrated circuit (FPGA), an application specific integrated circuits (ASIC) and other hardware device suitable for extracting instructions stored in the memory.

In some embodiments, the timing controller 122 controls the scan timing of the gate driving circuit 126. In some embodiments, the timing controller 122, the source driver 124 and the gate driving circuit 126 can be implanted by the integrated circuit. In some other embodiments, the timing controller 122 and the source driver 124 can be implanted by the integrated circuit, and the gate driving circuit 126 can be implemented by a gate driver on array. Therefore, it is not intended to limit the present disclosure.

Figure 8B:
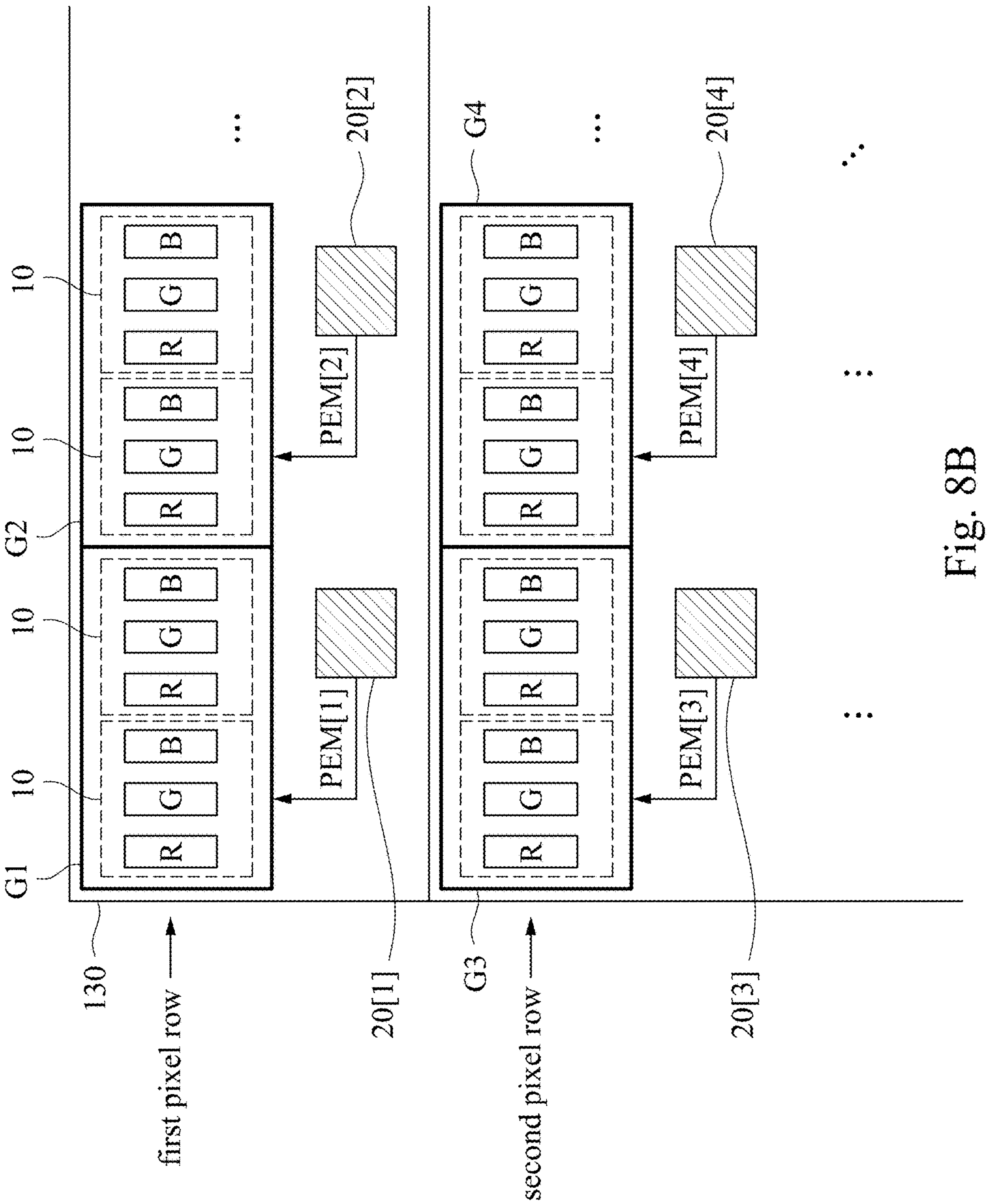
FIG. 8B depicts a schematic diagram of a display panel according to some embodiments of the present disclosure.

A description is provided with reference to FIG. 8A and FIG. 8B. FIG. 8B depicts a schematic diagram of a display panel 130 according to some embodiments of the present disclosure. As shown in FIG. 8B, the pixels 10 of the display panel 130 are grouped as pixel groups (such as, pixel groups G1~G4) to control the corresponding pixels 10 to operate under the adjusted duty cycles, in order to respectively control the pixels 10 included in the pixel groups G1~G4 under corresponding duty cycles. In some embodiments, each of the pixel groups G1~G4 includes multiple pixels 10, where each pixel 10 includes a red sub-pixel R, a green sub-pixel G and a blue sub-pixel B. In some embodiments, the pixel groups G1~G4 are respectively controlled by the emission control circuits 20[1]~20[4], and respectively operate according to the emission control signals PEM[1]~PEM[4] provided by the emission control circuits 20[1]~20[4]. In some embodiments, the pixel circuits corresponding to the red, the green and the blue pixels included in the pixel group G1 are electrically connected to the emission control circuit 20[1], and operate according to the emission control signal PEM[1]. The pixel circuits corresponding to the red, the green and the blue pixels included in the pixel group G2 are electrically connected to the emission control circuit 20[2], and operate according to the emission control signal PEM[2], and so on. The pixel circuits corresponding to the red, the green and the blue pixels included in the pixel group G3 are electrically connected to the emission control circuit 20[3], and operate according to the emission control signal PEM[3].

In some embodiments, the driving currents provided, by the pixel circuits corresponding to the red, the green and the blue pixels included in the pixel group G1, to the red, the green and the blue light emitting elements have the same pulse width, and the said pulse width of the driving currents correspond to a time length of the emission control signal PEM[1] at the enable voltage. In some embodiments, the driving currents provided, by the pixel circuits corresponding to the red, the green and the blue pixels included in the pixel group G2, to the red, the green and the blue light emitting elements, have the same pulse width, and the said pulse width of the driving currents correspond to a time length of the emission control signal PEM[2] at the enable voltage. In some embodiments, the driving currents provided, by the pixel circuits corresponding to the red, the green and the blue pixels included in the pixel group G3, to the red, the green and the blue light emitting elements, have the same pulse width, and the said pulse width of the driving currents correspond to a time length of the emission control signal PEM[3] at the enable voltage.

Figure 8C:
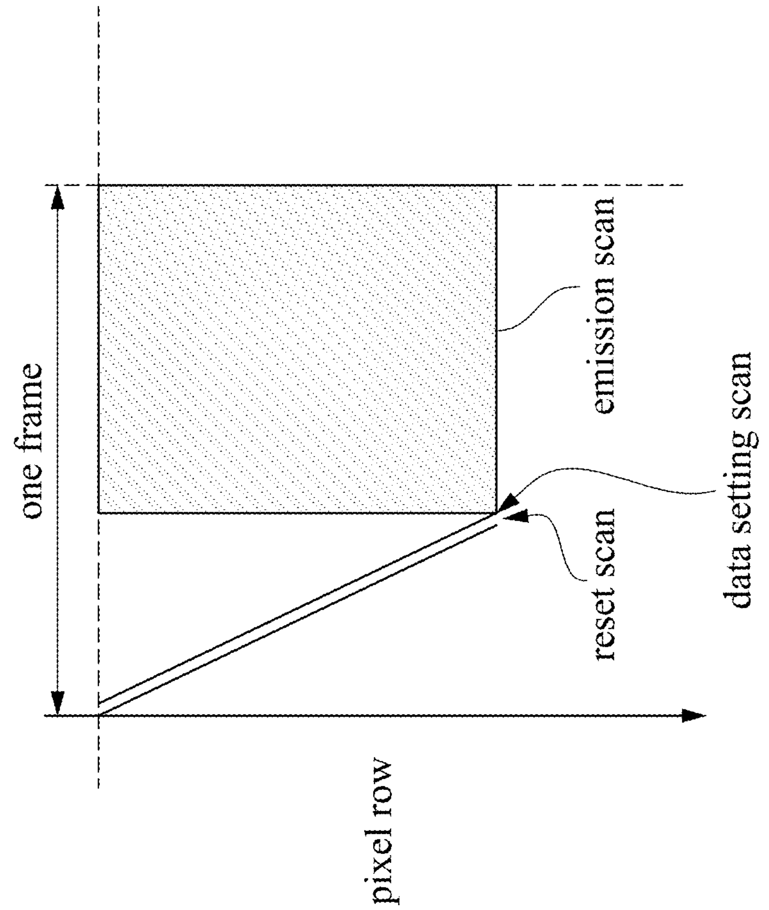
FIG. 8C depicts a schematic diagram of operations for driving a display device in one image frame according to some embodiments of the present disclosure.

A description is provided with reference to FIG. 8A, FIG. 8B and FIG. 8C. FIG. 8C depicts a schematic diagram of operations for driving a display device 100 in one image frame according to some embodiments of the present disclosure. As shown in FIG. 8C, the reset scan and the data setting scan are the progressively scan, and the emission scam of the display panel 130 is to perform emission control according to the local emission control signals for the pixel groups, and where the local emission control signals are generated based on a global signal.

Figure 9A:
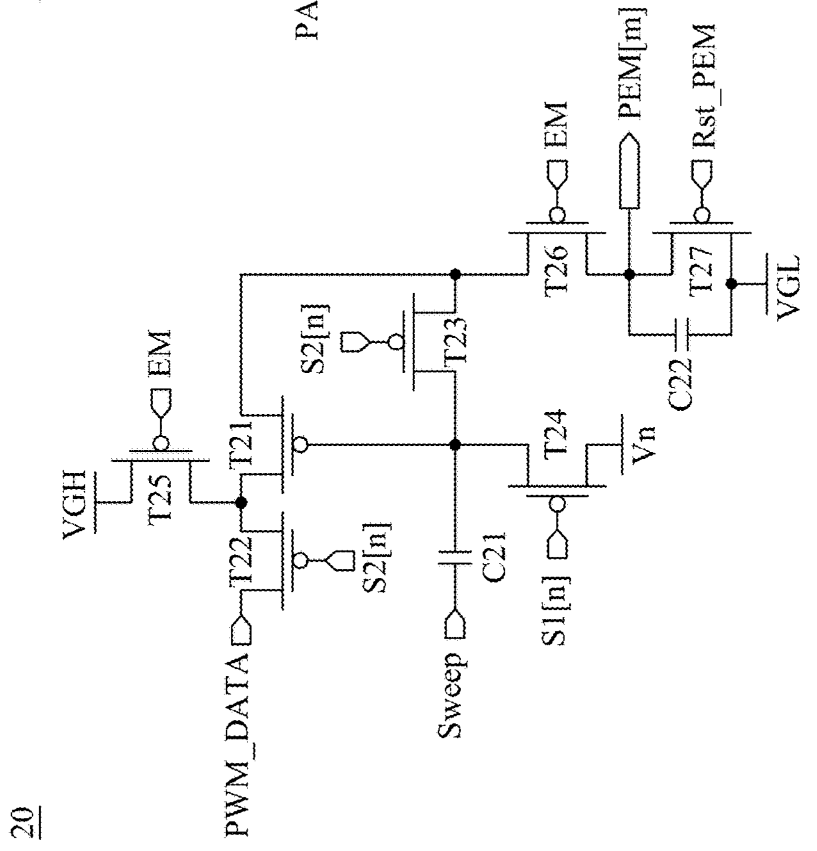
FIG. 9A depicts a schematic diagram of an emission control circuit according to some embodiments of the present disclosure.
Figure 9B:
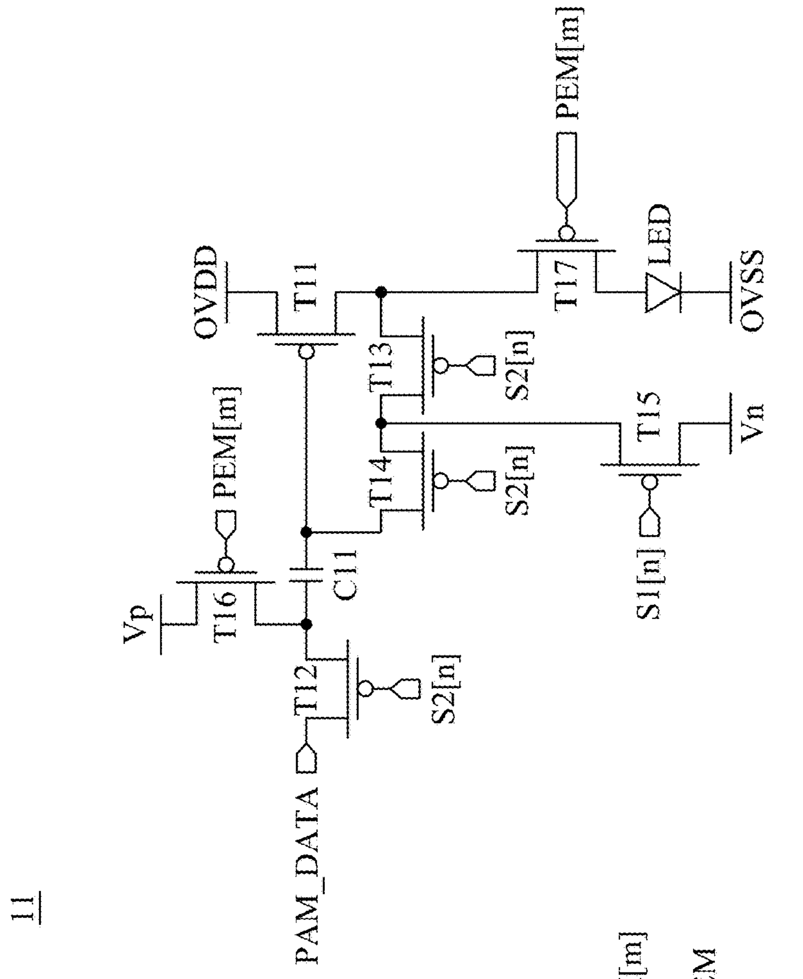
FIG. 9B depicts a schematic diagram of a pixel circuit according to some embodiments of the present disclosure.

A description is provided with reference to FIG. 8B, FIG. 9A and FIG. 9B. FIG. 9A depicts a schematic diagram of an emission control circuit 20 according to some embodiments of the present disclosure. FIG. 9B depicts a schematic diagram of a pixel circuit 11 according to some embodiments of the present disclosure. In some embodiments, each pixel circuit of the red sub-pixels R, the green sub-pixels G and the blue sub-pixels B included in the display panel 130 corresponds to the pixel circuit 11 in FIG. 9B. In some embodiments, an architecture of each of the emission control circuits 20[1]~20[4] in FIG. 8B corresponds to an architecture of the emission control circuit 20 in FIG. 9A.

As shown in FIG. 9A and FIG. 9B, the emission control circuit 20 generates and outputs the emission control signal PEM[m], according to the control signal EM and the data signal PWM_DATA, to the pixel circuit 11. The pixel circuit 11 operates according to control signals S1[*n*] and S2[*n*] and an emission control signal PEM[m], where the term "m" refer to which pixel group does the pixel circuit 11 belong to, and where the term "n" refer to which row in the pixel array does the pixel circuit 11 belong to.

In some embodiments, the emission control circuit 20 and the pixel circuit 11 share the control signals S1[*n*] and S2[*n*], thereby the number of the traces can be reduced. To be noted that, since the control signal EM is a global signal, and the emission control circuit 20 outputs the emission control signal PEM[m] based on the control signal EM, the emission control signal PEM[m] can control the pixel circuits included in different pixel rows. Therefore, each pixel group (such as, the pixel groups G1~G4) in FIG. 8B can be formed by more or less pixels (such as, 2 pixels*1 pixel, 2 pixels*2 pixels, 4 pixels*4 pixels), and therefore it is not intended to limit the present disclosure.

In some embodiments, the emission control circuit 20 includes transistors T21~T27. In structure, the transistors T21 and T25~T27 are electrically connected in series between a system high voltage terminal VGH and a system low voltage terminal VGL. In some embodiments, a first terminal of the transistor T22 is configured to receive a data signal PEM_DATA, and a second terminal of the transistor T22 is electrically connected to the first terminal of the transistor T21. In some embodiments, the function of the transistor T22 can be considered as a data setting transistor. In some embodiments, a first terminal of the transistor T23 is electrically connected to the second terminal of the transistor T21, and a second terminal of the transistor T23 is electrically connected to a gate terminal of the transistor T21. In some embodiments, a function of the transistor T23 can be considered as a compensation transistor. In some embodiments, a first terminal of the transistor T24 is electrically connected to the gate terminal of the transistor T21, and a second terminal of the transistor T24 is electrically connected to s reference voltage terminal Vn. In some embodiments, a function of the transistor T24 can be considered as a reset transistor. In some embodiments, a first terminal of the capacitor C21 is electrically connected to the gate terminal of the transistor T21, and a second terminal of the capacitor C21 is configured to receive a sweep signal. In some embodiments, the capacitor C21 is configured to gradually change a voltage at the gate terminal of the transistor T21 according to the sweep signal Sweep, thereby controlling a point in time for turning on the transistor T21 based on the data voltage of the data signal PWM_data, in order to control a pulse width of the emission control signal Rst_PEM. In some embodiments, the capacitor C22 is electrically connected between an output terminal of the emission control circuit 20 and the system low voltage terminal VGL, in order to stable a voltage at the output terminal of the emission control circuit 20.

As shown in FIG. 9B, the pixel circuit 11 includes transistors T11~T17 and a light emitting element LED. In some embodiments, the light emitting element LED is a light emitting diode. In some embodiments, the light emitting element LED is an inorganic light emitting diode. In some embodiments, the light emitting element LED is a micro-light emitting diode. In some embodiments, the light emitting element LED is an organic light emitting diode, and it is not intended to limit the present disclosure. In some embodiments, the transistors T11 and T17 and the light emitting element LED are electrically connected in series between a system high voltage terminal OVDD and a system low voltage terminal OVSS. In some embodiments, a first terminal of the transistor T11 is electrically connected to the system high voltage terminal OVDD, and a second terminal of the transistor T11 is electrically connected to a first terminal of the transistor T17. In some embodiments, the transistor T11 is configured to control a pulse amplitude of a driving current flowing through the light emitting element LED, and the transistor T17 is configured to control a pulse width of a driving current flowing through the light emitting element LED according to the emission control signal PEM[m]. In some embodiments, a first terminal of the transistor T12 is configured to receive a data signal PAM_DATA, and a second terminal of the transistor T12 is electrically connected through the capacitor C11 to the gate terminal of the transistor T11. In some embodiments, a function of the transistor T12 can be considered as a data setting transistor. In some embodiments, the transistors T13 and T14 are electrically connected in series between the second terminal of the transistor T11 and the gate terminal of the transistor T11. In some embodiments, functions of the transistors T13 and T14 can be considered as compensation transistor. In some embodiments, a first terminal of the transistor T15 is electrically connected through the transistor T14 to the gate terminal of the transistor T11, and a second terminal of the transistor T15 is electrically connected to the reference voltage terminal Vn. In some embodiments, a function of the transistor T15 can be considered as a reset transistor. In some embodiments, a first terminal of the transistor T16 is electrically connected to a reference voltage terminal Vp, and a second terminal of the transistor T16 is electrically connected through the capacitor C11 to the gate terminal of the transistor T11. In some embodiments, a function of the e transistor T16 can be considered as a stabilization transistor. In some embodiments, the pixel circuit 11 generates and provides a driving current according to the control signals S1[n] and S2[n] and the emission control signal PEM[m] to drive the light emitting element LED.

Figure 10:
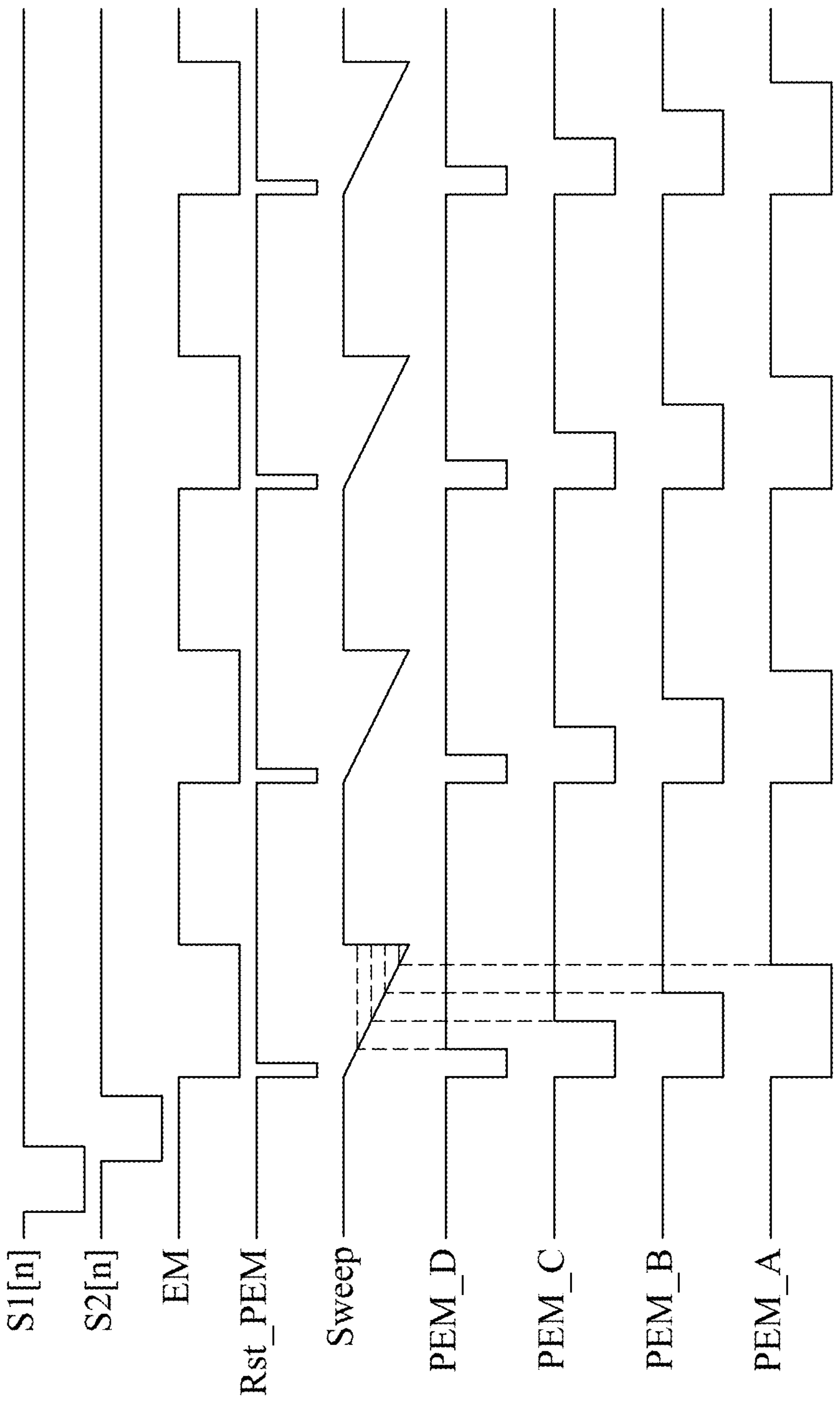
FIG. 10 depicts a timing diagram of control signals applied to the emission control circuit and the pixel circuit according to some embodiments of the present disclosure.

For better understanding of the operations of the emission control circuit 20 and the pixel circuit 11. A description is provided with reference to FIG. 9A, 9B and FIG. 10. FIG. 10 depicts a timing diagram of control signals applied to the emission control circuit 20 and the pixel circuit 11 according to some embodiments of the present disclosure.

As shown in FIG. 9A and FIG. 10, by applying the control signal S1[n] to the gate terminal of the transistor T24 to close a current path from the gate terminal of the transistor T21 to the reference voltage terminal Vn, thereby performing a reset operation. In some embodiments, by applying the control signal S2[n] to the gate terminals of the transistors T22~T23 to transmit the data voltage of the data signal PWM_DATA through transistors T22, T21 and T23 to the gate terminal of the transistor T21, until the transistor T21 is cut-off, thereby performing compensation operation. As such, after the end of the compensation operation, the voltage at the gate terminal of the transistor T21 includes factors of the data voltage of the data signal PWM_DATA. In some embodiments, by applying the control signal EM to the gate terminals of the transistors T25~T26 to close current paths from the system high voltage terminal VGH to the second terminal of the transistor T21 and the first terminal of the transistor T21 to output terminal of the emission control circuit 20. In some embodiments, by applying the control signal Rst_PEM to the gate terminal of the transistor T27, to close a current path from the output terminal of the emission control circuit 20 to the system low voltage terminal VGL, thereby output the emission control signal PEM[m] at the low logic level. In some embodiments, when the sweep signal Sweep linearly reduce a voltage at the gate terminal of the transistor T21 by coupling effect of the capacitor C21, a point in time that the transistor T21 turned on is determined according to the data voltage of PWM-_DATA when is set in compensation operation. When the transistor T21 is turned on, the voltage of the system high voltage terminal VGH is transmitted through the transistors T25, T21 and T26 to the output terminal of the emission control circuit 20, so as to output the emission control signal PEM[m] at the high logic level.

In some embodiments, a falling edge of the emission control signal PEM[m] is determined according to falling edges of the control signals EM and Rst_PEM, and a rising edge of the emission control signal PEM[m] is determined according to the data voltage of the data signal PWM-_DATA. As such, by the setting of the data voltage of the data signal PWM_DATA, the pulse width of the emission control signal PEM[m] can be adjusted or controlled. In some embodiments, the data voltages of the data signal PWM_DATA provided by the source driver 124 are selected from 3~8 voltages, such that there are 3~8 levels of the duty cycles for each pixel group included in the display panel 130. In the embodiments of FIG. 10, the data voltages of the data signal PWM_DATA provided by the source driver 124 are selected from 4 predetermined voltages, and the emission control circuit 20 generates a corresponding one of the emission control signals PEM_A~PEM_D according to the data voltages of the data signal PWM_DATA provided by the source driver 124, and outputs it to the pixel circuit 11, so as to control the pulse width of the driving current flowing through the pixel circuit 11.

As shown in FIG. 9B and FIG. 10, by applying the control signal S1[n] to the transistor T15 and applying the control signal S2[n] to the transistor T14 to close a current path from the reference voltage terminal Vn to the gate terminal of the transistor T11, thereby performing reset operation. In some embodiments, by applying the control signal S2[n] to the gate terminal of the transistor T12 to transmit the data voltage of the data signal PAM_DATA to the second terminal of the capacitor C11, thereby performing data setting operation. In some embodiments, by applying the control signal S2[n] to the gate terminals of the transistors T13~T14, as such a voltage of the system high voltage terminal OVDD is transmitted through the transistors T11, T13 and T14 to the gate terminal of the transistor T11, until the transistor T11 is cut-off, so as to perform compensation operation. In some embodiments, by applying the emission control signal PEM[m] to the gate terminal of the transistor T16, as such a voltage of the reference voltage terminal Vp is transmitted to the second terminal of the capacitor C11. Meanwhile, a voltage at the second terminal of the capacitor C11 changes from the data voltage of the data signal PAM_DATA to the voltage of the reference voltage terminal Vp, this voltage variation is transferred to the gate terminal of the transistor T11 by coupling effect, such that the voltage at the gate terminal of the transistor T11 includes a factor of the data voltage of the data signal PAM_DATA, in order to control the pulse amplitude of the driving current by the setting of the data voltage of the data signal PAM_DATA. In some embodiments, the emission control signal PEM[m] controls the transistor T17 to turn on or turn off, in order to control the pulse width of the driving current. In the embodiments of FIG. 10, the emission control signal PEM[m] corresponds to any one of the emission control signals PEM_A~PEM_D. In some embodiments, the pulse width of the driving current corresponds to the time length of the emission control signal PEM[m] at the low logic level.

Figure 11A:
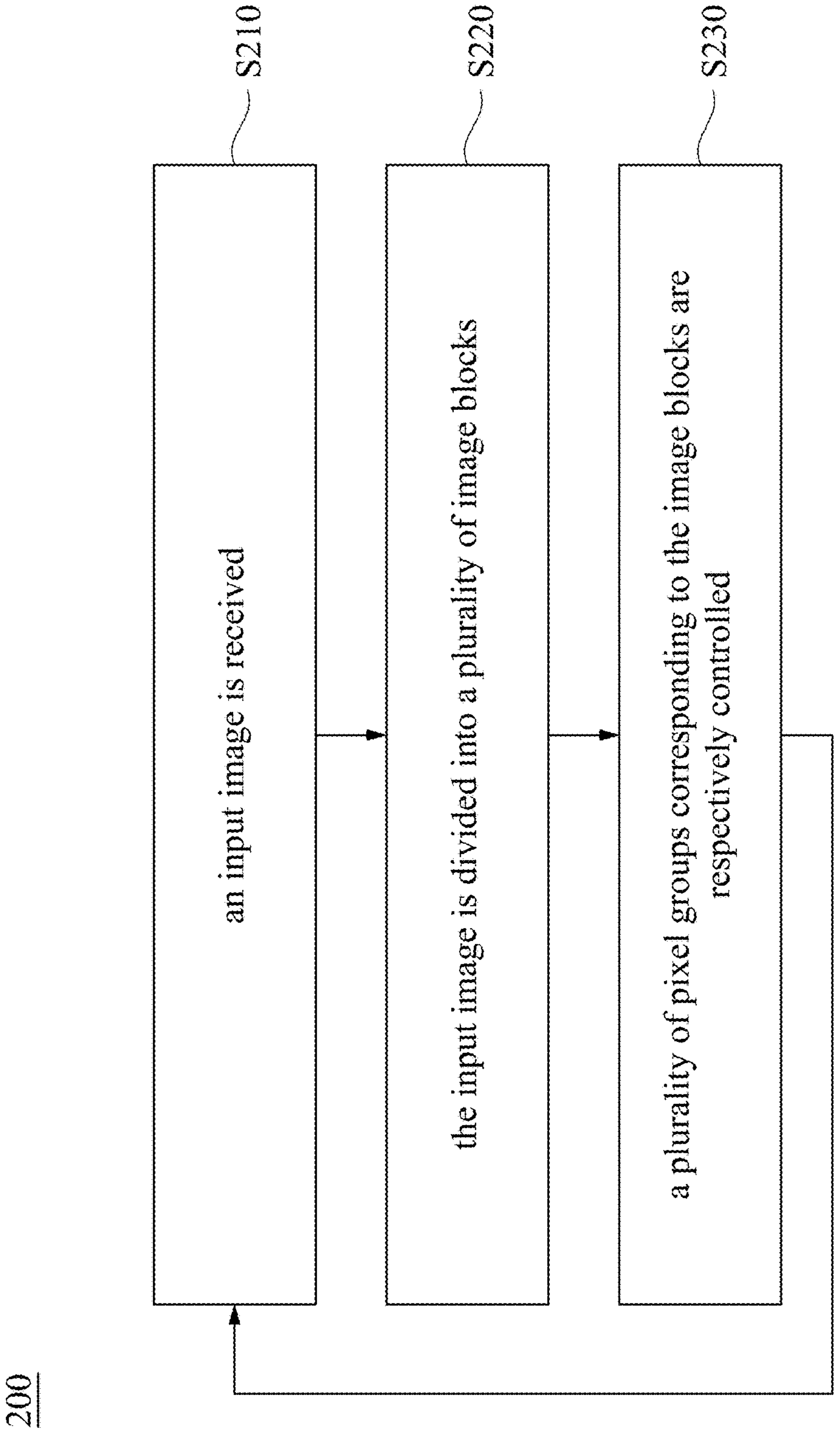
FIG. 11A depicts a flow chart of a driving method according to some embodiments of the present disclosure.

A description is provided with reference to FIG. 8A, FIG. 8B and FIG. 11. FIG. 11A depicts a flow chart of a driving method 200 according to some embodiments of the present disclosure. As shown in FIG. 11, the driving method 200 includes step S210~S230. In some embodiments, steps S210~S220 can be performed by the processing circuit 112, and step S230 can be performed by the processing circuit 112 and the driving circuit 120.

In step S210, an input image is received. In some embodiments, the input image SIN is received by the processing circuit 112 of the display device 100.

In step S220, the input image is divided into a plurality of image blocks. In some embodiments, the processing circuit 112 of the display device 100 divides the input image into multiple image blocks, and the said image blocks respectively correspond to the pixel group (such as, the pixel groups G1~G4).

In step S230, a plurality of pixel groups corresponding to the image blocks are respectively controlled. In some embodiments, the display device 100 controls the corresponding to the pixel groups (such as, the pixel groups G1~G4) according to the image blocks.

Figure 11B:
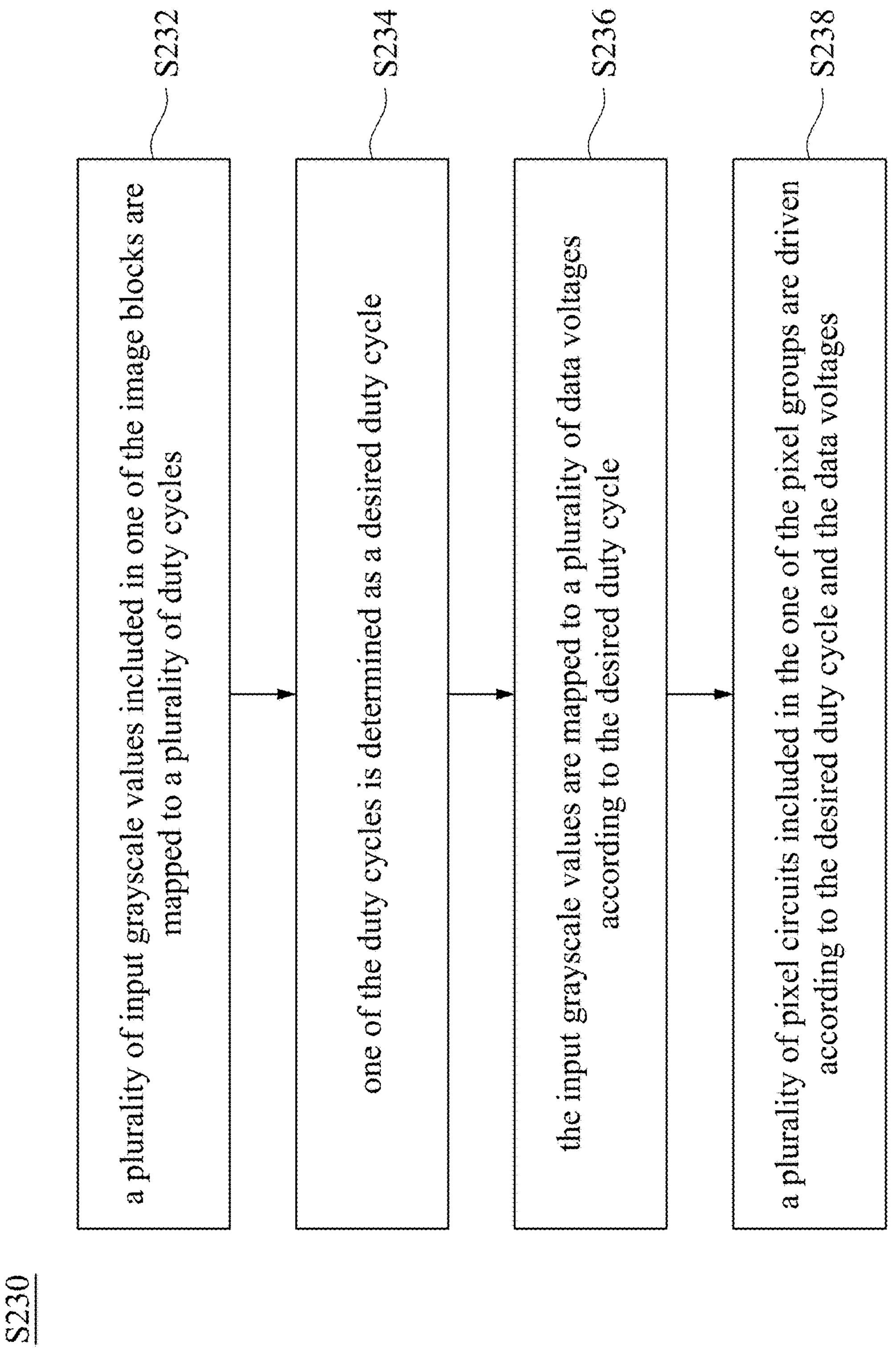
FIG. 11B depicts a flow chart of a step S230 in a driving method according to some embodiments of the present disclosure.
Figure 12:
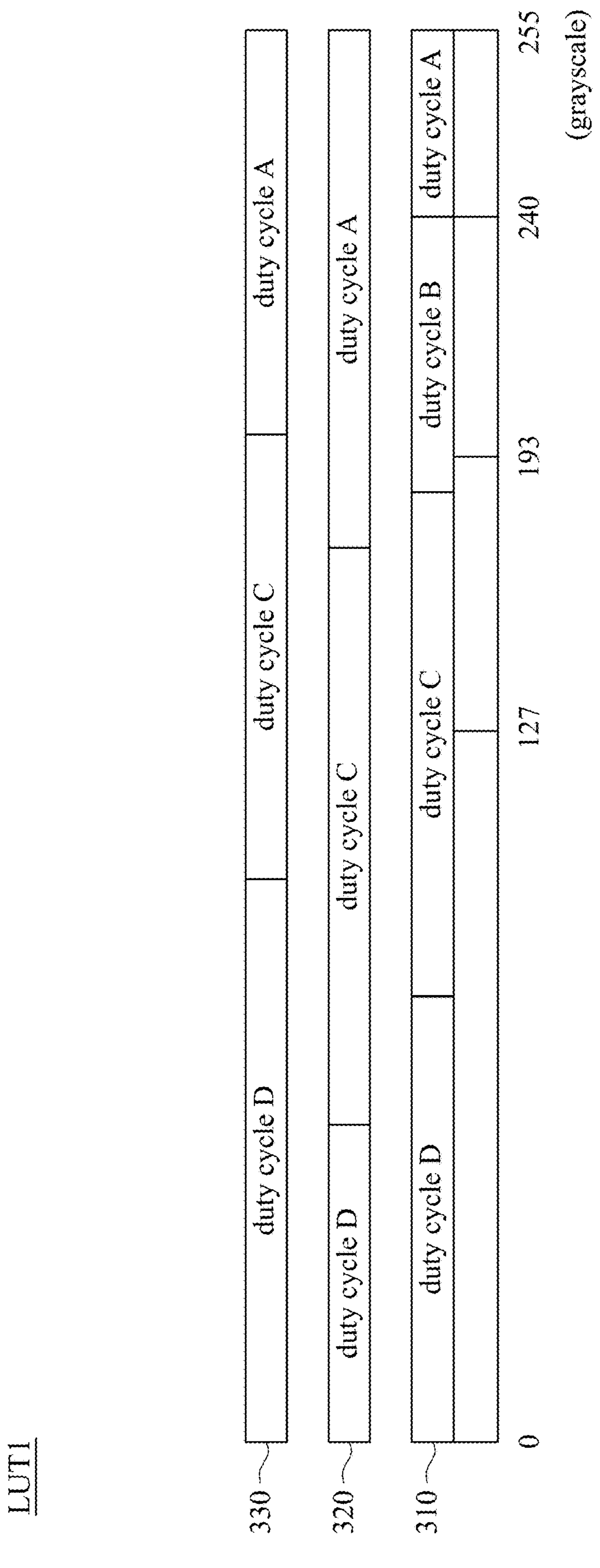
FIG. 12 depicts a schematic diagram of a lookup table according to some embodiments of the present disclosure.
Figure 13:
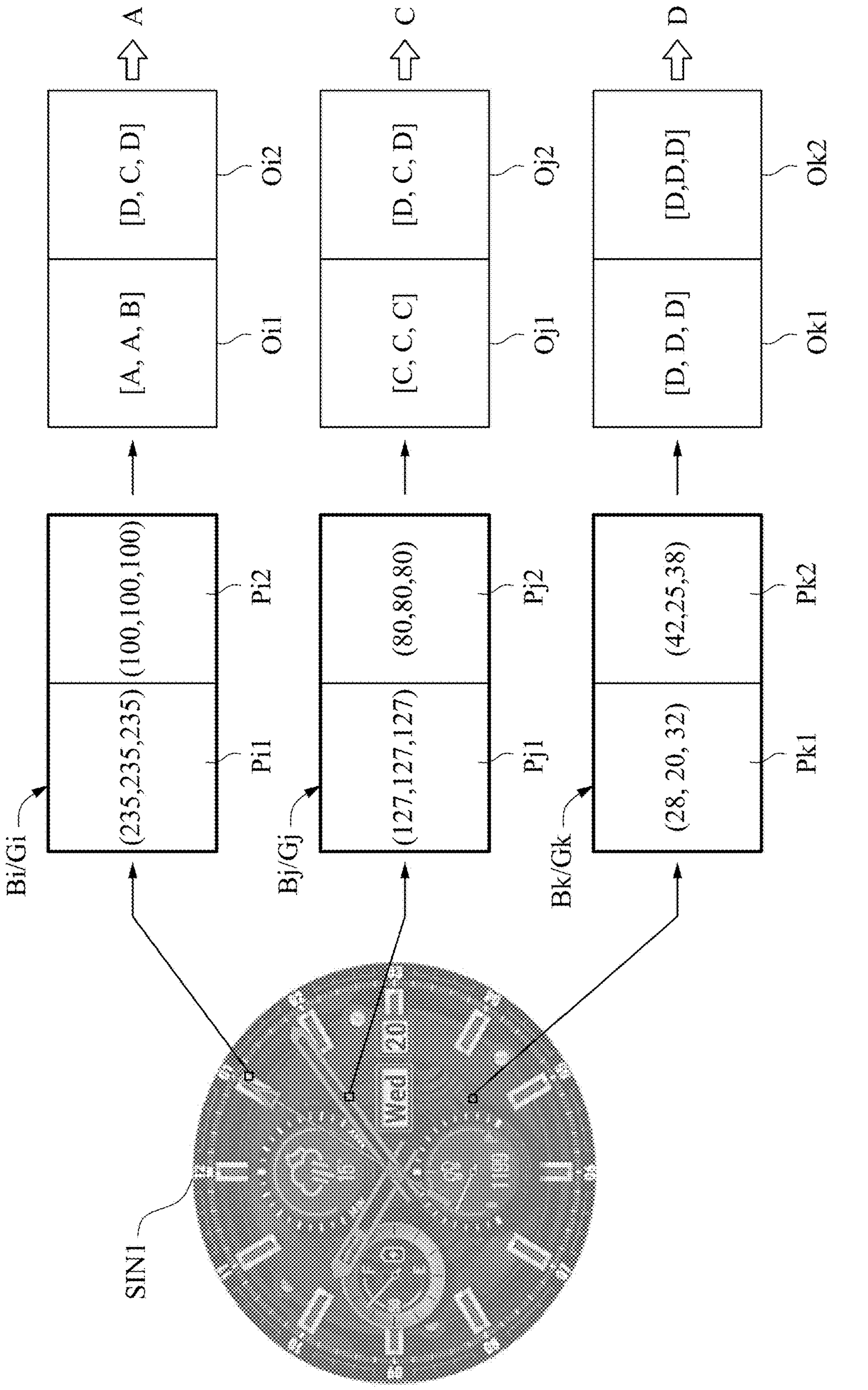
FIG. 13 depicts a schematic diagram of an operation of a driving method according to some embodiments of the present disclosure.

A description is provided with reference to FIG. 8A, FIG. 8B, FIG. 11B, FIG. 12 and FIG. 13. FIG. 11B depicts a flow chart of a step S230 in a driving method 200 according to some embodiments of the present disclosure. FIG. 12 depicts a schematic diagram of a lookup table LUT1 according to some embodiments of the present disclosure. FIG. 13 depicts a schematic diagram of an operation of a driving method 200 according to some embodiments of the present disclosure.

As shown in FIG. 11B, step S230 includes steps S232~S238. In some embodiments, steps S232~S236 can be performed by the processing circuit 112, and step S238 can be performed by the driving circuit 120.

In step S232, a plurality of input grayscale values included in one of the image blocks are mapped to a plurality of duty cycles. In the embodiments of FIG. 13, three image blocks Bi~Bk in the image block Bi are taken for an example. In some embodiments, the image block Bi includes pixel values Pi1 and Pi2 for two pixels; the pixel values Pi1 of (235, 235, 235) refers to input grayscale values of the red, green and the blue sub-pixels. The pixel values Pi2 of (100, 100, 100) refers to input grayscale values of the red, green and the blue sub-pixels. The processing circuit 112 maps the input grayscale values of the red, green and the blue sub-pixels includes in pixel values Pi1 and Pi2 through the lookup table LUT1 to the output value groups Oi1 and Oi2, where each of the output value groups Oi1 and Oi2 includes the duty cycles of the red, green and the blue sub-pixels. For example, the processing circuit 112 maps the input grayscale value (such as, 235) of the red sub-pixel included in pixel values Pi1 through the lookup table LUT1 to the duty cycle A for red data 310. The processing circuit 112 maps the input grayscale value (such as, 235) of the green sub-pixel included in pixel values Pi1 through the lookup table LUT1 to the duty cycle A for green data 320. The processing circuit 112 maps the input grayscale value (such as, 235) of the blue sub-pixel included in pixel values Pi1 through the lookup table LUT1 to the duty cycle B for blue data 330. As such, the output value group Oi1 can be expressed by [A, A, B].

For another example, the processing circuit 112 maps the input grayscale value (such as, 100) of the red sub-pixel included in pixel values Pi2 through the lookup table LUT1 to the duty cycle D for red data 310. The processing circuit 112 maps the input grayscale value (such as, 100) of the green sub-pixel included in pixel values Pi2 through the lookup table LUT1 to the duty cycle C for green data 320. The processing circuit 112 maps the input grayscale value (such as, 100) of the blue sub-pixel included in pixel values Pi2 through the lookup table LUT1 to the duty cycle D for blue data 330. As such, the output value group Oi2 can be expressed by [D, C, D].

In some embodiments, the image block Bj includes pixel values Pj1 and Pj2 for two pixels; the pixel values Pj1 of (127, 127, 127) refers to input grayscale values of the red, green and the blue sub-pixels. The pixel values Pj2 of (80, 80, 80) refers to input grayscale values of the red, green and the blue sub-pixels. The processing circuit 112 maps the input grayscale values of the red, green and the blue sub-pixels includes in pixel values Pj1 and Pj2 through the lookup table LUT1 to the output value groups Oj1 and Oj2, where each of the output value groups Oj1 and Oj2 includes the duty cycles of the red, green and the blue sub-pixels.

In some embodiments, the image block Bk includes pixel values Pk1 and Pk2 for two pixels; the pixel values Pk1 of (28, 20, 32) refers to input grayscale values of the red, green and the blue sub-pixels. The pixel values Pk2 of (42, 25, 38) refers to input grayscale values of the red, green and the blue sub-pixels. The processing circuit 112 maps the input grayscale values of the red, green and the blue sub-pixels includes in pixel values Pk1 and Pk2 through the lookup table LUT1 to the output value groups Ok1 and Ok2, where each of the output value groups Ok1 and Ok2 includes the duty cycles of the red, green and the blue sub-pixels.

To be noted that, the duty cycles A~D in each of the red data 310, the green data 320 and the blue data 330 are determined by the luminous efficiencies and the power consumptions of the red light emitting element, the green light emitting element and the blue light emitting element under conditions of different grayscale levels. The small the duty ratio of the driving current is, the more power can be saved for the red light emitting element, and it is unable to meet a best efficiency point. The efficiency and the duty ratio of the green and the blue light emitting diode are not are not positively related, and therefore the best current critic point of the green and blue light emitting diode can be found based on the experiments, in order to create the red data 310, the green data 320 and the blue data 330.

In step S234, one of the duty cycles is determined as a desired duty cycle. In some embodiments, the processing circuit 112 determined a largest one of the duty cycles as the desired duty cycle. For an example, the output value group Oi1 includes the duty cycles A and B, and the output value group Oi2 includes the duty cycles C and D. Since the order from largest to smallest is the duty cycles A to D, the processing circuit 112 selected the duty cycle A from the duty cycles included in the output value groups Oi1 and Oi2 as a desired duty cycle for operating the pixel group Gi corresponding to the image block Bi in the frame.

For another example, the output value group Oj1 includes the duty cycle C, and the output value group Oj2 includes the duty cycles C and D. Since the order from largest to smallest is the duty cycles A to D, the processing circuit 112 selected the duty cycle C from the duty cycles included in the output value groups Oj1 and Oj2 as a desired duty cycle for operating the pixel group Gj corresponding to the image block Bj in the frame. Similarity, the processing circuit 112 selected the duty cycle D from the duty cycles included in the output value groups Ok1 and Ok2 as a desired duty cycle for operating the pixel group Gk corresponding to the image block Bk in the frame.

In step S236, a plurality of the input grayscale values are mapped to a plurality of data voltages according to the desired duty cycle. In some embodiments, the processing circuit 112 maps the input grayscale values through the lookup table LUT2 to data voltages. In some embodiments, the lookup table LUT2 includes correlation relationship between grayscale levels and red data voltages, green data voltages and blue data voltages under conditions of multiple duty cycles (such as, duty cycles A~D). In some embodiments, the red data voltages in the lookup table LUT2 are given by the following Table 2.

TABLE 2

| | red data voltage | | | |
|---|---|---|---|---|
| binding point | duty cycle A | duty cycle B | duty cycle C | duty cycle D |
| 1 | 0.21 | 0.21 | 0.21 | 0.21 |
| 2 | 0.59 | 0.57 | 0.58 | 0.60 |
| 3 | 0.74 | 0.77 | 0.78 | 0.79 |
| 4 | 0.79 | 0.82 | 0.84 | 0.86 |
| 5 | 0.86 | 0.91 | 0.93 | 0.95 |
| . . . | . . . | . . . | . . . | . . . |
| 25 | 2.58 | 2.81 | 2.92 | 3.04 |
| 26 | 2.69 | 2.96 | 3.11 | 3.26 |

In Table 2, the binding points refer to 26 binding points in the gamma curve of the red sub-pixel with respect to 255 grayscale levels. In other words, based on the Table 2, four gamma curves under conditions of duty cycles A~D can be created, and the said four gamma curves are the gamma curves of the red sub-pixel under conditions of different duty cycles. As a result, based on the desired duty cycle of the pixel group, the gamma curve of the red sub-pixel included each pixel group can be determined, and substitutes the input grayscale values of the original input image SIN1 for the red sub-pixel included into the corresponding gamma curve, the data voltages for the red sub-pixel in each pixel group can be obtained. For example, based on the desired duty cycle D for operating the pixel group Gk in this frame, a gamma curve for the red sub-pixel is determined, and the red grayscale values of 28 and 42 included in the image block Bk are substituted into the said gamma curve (such as, a gamma curve for the red sub-pixel corresponding to the duty cycle D), as such all data voltages of the red sub-pixels included in the pixel group Gk can be obtained.

In some embodiments, the green data voltages in the lookup table LUT2 are given by the following Table 3.

TABLE 3

| green data voltage | | | | |
|---|---|---|---|---|
| binding point | duty cycle A | duty cycle B | duty cycle C | duty cycle D |
| 1 | 0.21 | 0.21 | 0.21 | 0.21 |
| 2 | 0.39 | 0.35 | 0.31 | 0.28 |
| 3 | 0.54 | 0.525 | 0.51 | 0.47 |
| 4 | 0.59 | 0.58 | 0.57 | 0.54 |
| 5 | 0.63 | 0.62 | 0.61 | 0.59 |
| . . . | . . . | . . . | . . . | . . . |
| 25 | 2.01 | 2.025 | 2.04 | 2.10 |
| 26 | 2.12 | 2.14 | 2.16 | 2.23 |

In Table 3, the binding points refer to 26 binding points in the gamma curve of the green sub-pixel with respect to 255 grayscale levels. In other words, based on the Table 3, four gamma curves under conditions of duty cycles A~D can be created, and the said four gamma curves are the gamma curves of the green sub-pixel under conditions of different duty cycles. As a result, based on the desired duty cycle of the pixel group, the gamma curve of the green sub-pixel included each pixel group can be determined, and substitutes the input grayscale values of the original input image SIN1 for the green sub-pixel included into the corresponding gamma curve, the data voltages for the green sub-pixel in each pixel group can be obtained. For example, based on the desired duty cycle D for operating the pixel group Gk in this frame, a gamma curve for the green sub-pixel is determined, and the green grayscale values of 20 and 25 included in the image block Bk are substituted into the said gamma curve (such as, a gamma curve for the green sub-pixel corresponding to the duty cycle D), as such all data voltages of the green sub-pixels included in the pixel group Gk can be obtained.

In some embodiments, the blue data voltages in the lookup table LUT2 are given by the following Table 4.

TABLE 4

| blue data voltage | | | | |
|---|---|---|---|---|
| binding point | duty cycle A | duty cycle B | duty cycle C | duty cycle D |
| 1 | 0.21 | 0.21 | 0.21 | 0.21 |
| 2 | 0.52 | 0.495 | 0.47 | 0.46 |
| 3 | 0.59 | 0.58 | 0.57 | 0.56 |
| 4 | 0.62 | 0.61 | 0.60 | 0.59 |
| 5 | 0.66 | 0.655 | 0.65 | 0.65 |
| . . . | . . . | . . . | . . . | . . . |
| 25 | 2.17 | 2.205 | 2.24 | 2.30 |
| 26 | 2.28 | 2.315 | 2.35 | 2.44 |

In Table 4, the binding points refer to 26 binding points in the gamma curve of the blue sub-pixel with respect to 255 grayscale levels. In other words, based on the Table 4, four gamma curves under conditions of duty cycles A~D can be created, and the said four gamma curves are the gamma curves of the blue sub-pixel under conditions of different duty cycles. As a result, based on the desired duty cycle of the pixel group, the gamma curve of the blue sub-pixel included each pixel group can be determined, and substitutes the input grayscale values of the original input image SIN1 for the blue sub-pixel included into the corresponding gamma curve, the data voltages for the blue sub-pixel in each pixel group can be obtained. For example, based on the desired duty cycle D for operating the pixel group Gk in this frame, a gamma curve for the blue sub-pixel is determined, and the blue grayscale values of 32 and 38 included in the image block Bk are substituted into the said gamma curve (such as, a gamma curve for the blue sub-pixel corresponding to the duty cycle D), as such all data voltages of the blue sub-pixels included in the pixel group Gk can be obtained.

In step S236, the processing circuit 112 maps the input grayscale values included in the input image SIN to the data voltages R/G/B according to the desired duty cycles of each pixel group, and output the data voltages R/G/B of all the sub-pixels to the driving circuit 120.

In step S238, a plurality of pixel circuits included in the one of the pixel groups are driven according to the desired duty cycle and the data voltages. In some embodiments, the processing circuit 112 outputs the desired duty cycle of each of the pixel group by the emission control data EMDATA, and outputs the data voltage of each of the pixel circuit by the data voltages R/G/B. The data voltages R/G/B includes the red data voltages, the green data voltages and the blue data voltages obtained in step S236.

In some embodiments, the driving circuit 120 locally controls the time length of the emission period of each pixel groups (such as, pixel groups G1~G4) included in the display panel 130 according to the emission control data EMDATA, as such the light emitting elements included in each pixel group can operate in better efficiency.

In some embodiments, each of the emission control signals PEM[1]~PEM[4] generated by the emission control circuits 20[1]~20[4] is a corresponding one of the emission control signals PEM_A~PEM_D, and the emission control signals PEM_A~PEM_D respectively correspond to the duty cycles A~D. For example, the source driver 124 generates the data voltage of the data signal PWM_DATA according to the desired duty cycle (such as, the desired duty cycle A) to the emission control circuit 20[1], as such the emission control circuit 20[1] generates and output the emission control signal PEM_A to every sub-pixels included in the pixel group G1. The sub-pixels included in the pixel group G1 is controlled by the emission control signal PEM_A in this frame. In some embodiments, the processing circuit 112 generates the data voltages of all sub-pixels included in the pixel group G1 according to the duty cycle A, and the source driver 124 drives the red, green and the blue sub-pixels according to the said data voltages, so as to improve the operation efficiency of the red, green and the blue light emitting elements.

Figure 14B:
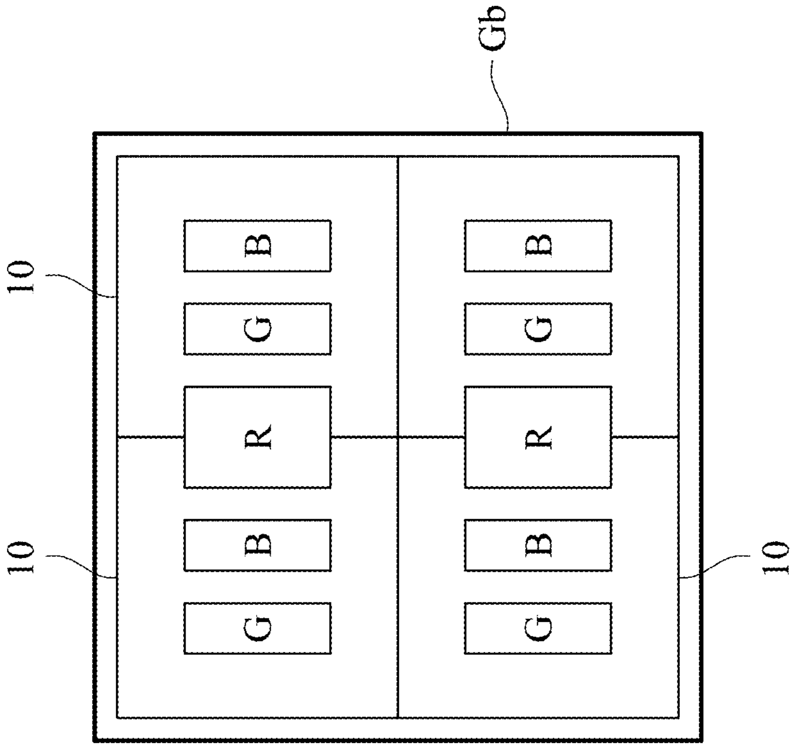
FIG. 14B depicts a schematic diagram of a pixel group according to some embodiments of the present disclosure.
Figure 14A:
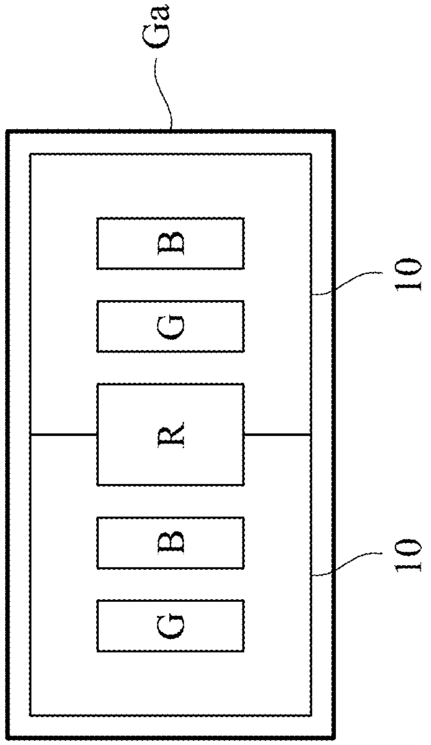
FIG. 14A depicts a schematic diagram of a pixel group according to some embodiments of the present disclosure.

A description is provided with reference to FIG. 14A. FIG. 14A depicts a schematic diagram of a pixel group Ga according to some embodiments of the present disclosure. In some embodiments, the pixel group G1~G4 in FIG. 8B can be implemented by the pixel group Ga. In the embodiments, the pixel group Ga includes two pixels 10, which are arranged in an array of 2*1, and each of the two pixels 10 includes two green sub-pixels G, two blue sub-pixels B and one red sub-pixel R. In some embodiments, all of the sub-pixels included in the pixel group Ga are controlled by the same emission control circuit. In other words, the pixel circuits of the sub-pixel included in the pixel group Ga operate according to the same emission control signal. Therefore, the number of the pixels or the sub-pixels included in the pixel group in the aforementioned embodiment is for illustration; it is not intended to limit the present disclosure.

A description is provided with reference to FIG. 14B. FIG. 14B depicts a schematic diagram of a pixel group Gb according to some embodiments of the present disclosure. In some embodiments, the pixel group G1~G4 in FIG. 8B can be implemented by the pixel group Gb. In the embodiments, the pixel group Gb includes four pixels 10, which are arranged in an array of 2*2, and each of the four pixels 10 includes two green sub-pixels G, two blue sub-pixels B and one red sub-pixel R. In some embodiments, all of the sub-pixels included in the pixel group Gb are controlled by the same emission control circuit. In other words, the pixel circuits of the sub-pixel included in the pixel group Gb operate according to the same emission control signal. Therefore, the number of the pixels or the sub-pixels included in the pixel group in the aforementioned embodiment is for illustration; it is not intended to limit the present disclosure.

Figure 14C:
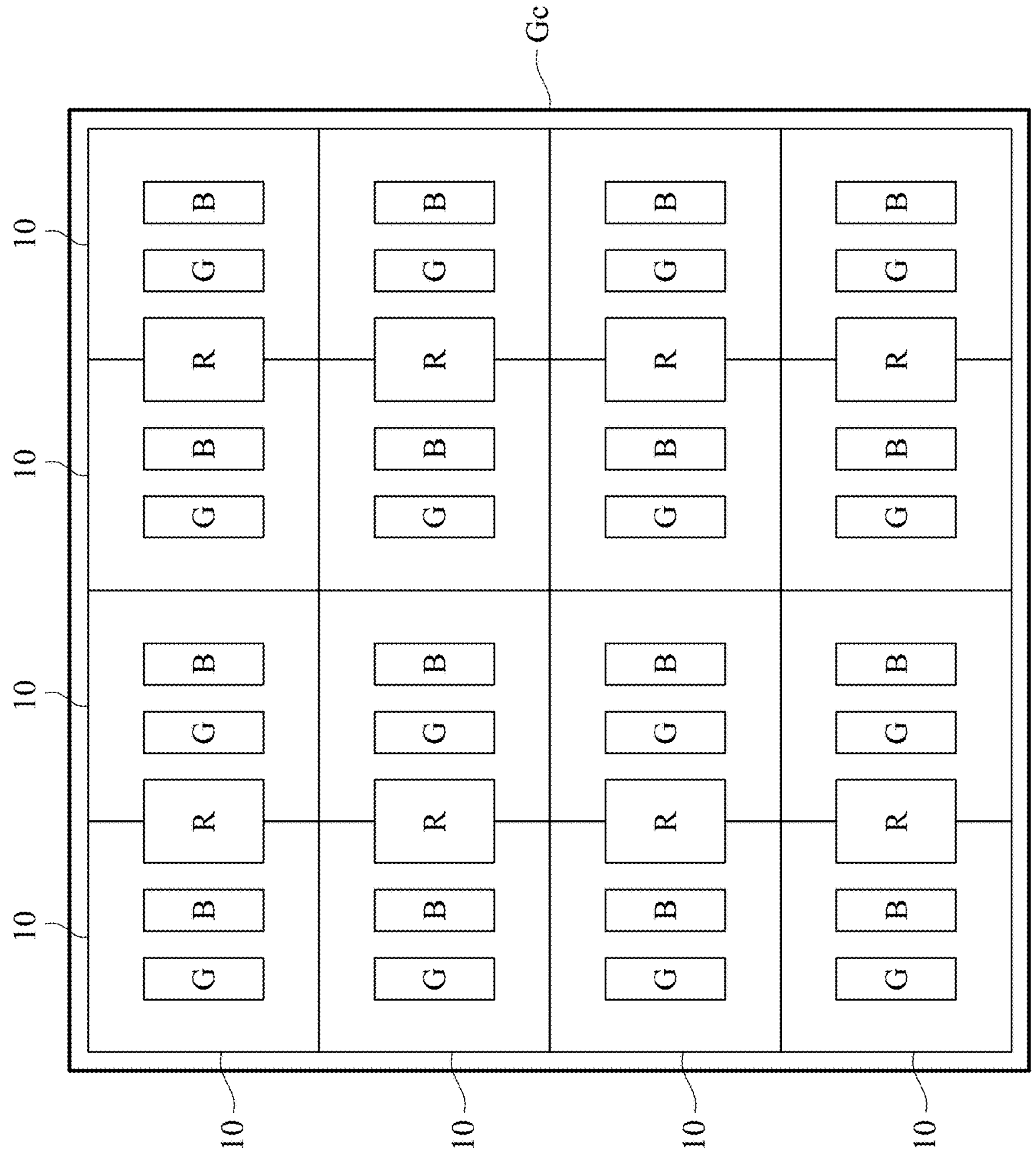
FIG. 14C depicts a schematic diagram of a pixel group according to some embodiments of the present disclosure.

A description is provided with reference to FIG. 14C. FIG. 14C depicts a schematic diagram of a pixel group Gc according to some embodiments of the present disclosure. In some embodiments, the pixel group G1~G4 in FIG. 8B can be implemented by the pixel group Gc. In the embodiments, the pixel group Gc includes sixteen pixels 10, which are arranged in an array of 4*4, and each of the sixteen pixels 10 includes two green sub-pixels G, two blue sub-pixels B and one red sub-pixel R. In some embodiments, all of the sub-pixels included in the pixel group Gc are controlled by the same emission control circuit. In other words, the pixel circuits of the sub-pixel included in the pixel group Gc operate according to the same emission control signal. Therefore, the number of the pixels or the sub-pixels included in the pixel group in the aforementioned embodiment is for illustration; it is not intended to limit the present disclosure.

Figure 15A:
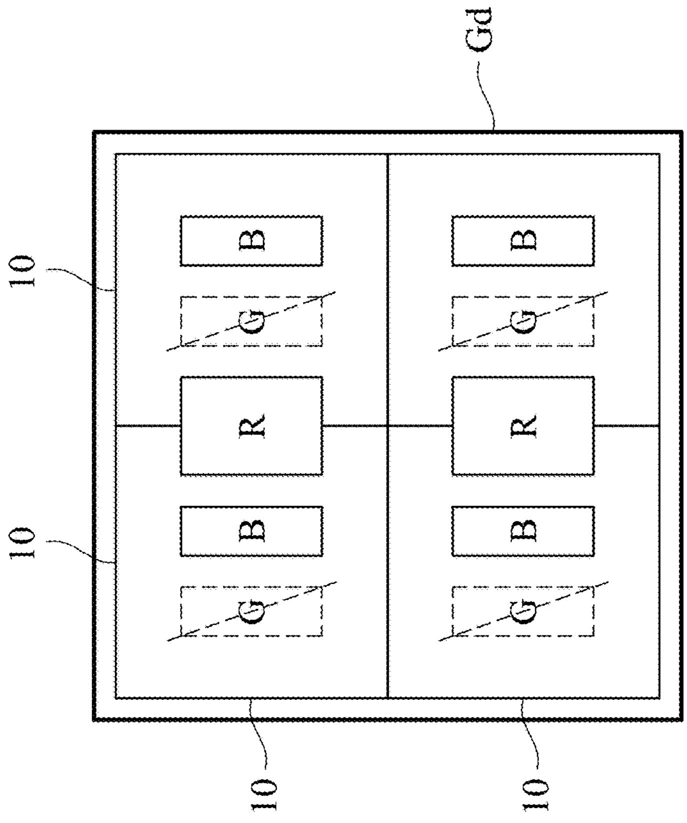
FIG. 15A depicts a schematic diagram of sub-pixels included in a pixel group controlled by an emission control circuit according to some embodiments of the present disclosure.

A description is provided with reference to FIG. 15A. FIG. 15A depicts a schematic diagram of sub pixels included in a pixel group Gd controlled by an emission control circuit according to some embodiments of the present disclosure. In some embodiments, the pixel group G1~G4 in FIG. 8B can be implemented by the pixel group Gd. In some embodiments, all of the red sub-pixels R and blue sub-pixels B included in the pixel group Gd are controlled by the same emission control signal (such as, the emission control signal PEM[m]) provided by the emission control circuit, and all of the green sub-pixels G included in the pixel group Gd are controlled by the global signal (such as, the control signal EM). That is, the emission control circuit controls all of the red sub-pixels R and blue sub-pixels B included in the pixel group Gd, and the emission control circuit does not control the green sub-pixels G included in the pixel group Gd.

Figure 15B:
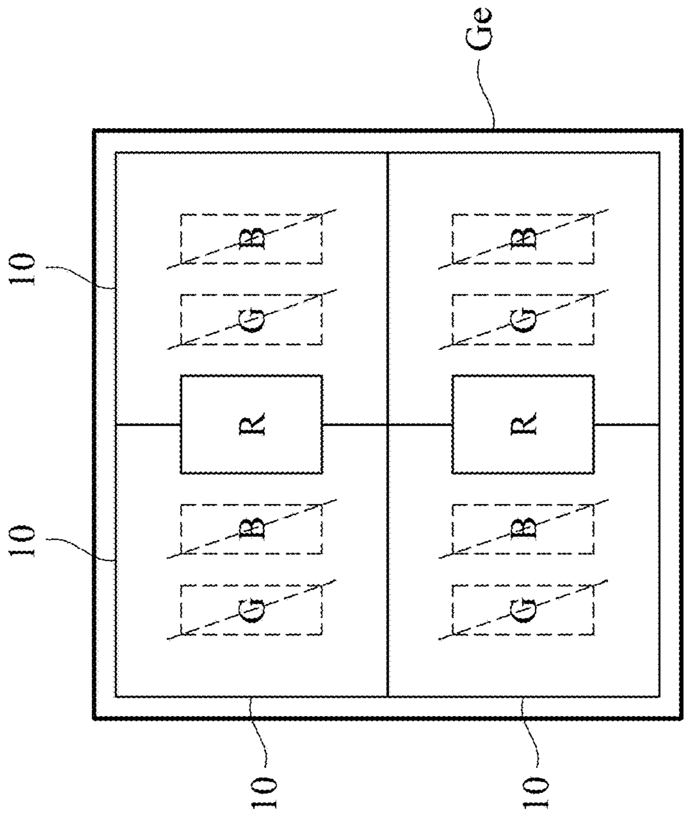
FIG. 15B depicts a schematic diagram of sub-pixels included in a pixel group controlled by an emission control circuit according to some embodiments of the present disclosure.

A description is provided with reference to FIG. 15B. FIG. 15B depicts a schematic diagram of sub pixels included in a pixel group Ge controlled by an emission control circuit according to some embodiments of the present disclosure. In some embodiments, the pixel group G1~G4 in FIG. 8B can be implemented by the pixel group Ge. In some embodiments, all of the red sub-pixels R included in the pixel group Ge are controlled by the same emission control signal (such as, the emission control signal PEM[m]) provided by the emission control circuit, and all of the green sub-pixels G and blue sub-pixels B included in the pixel group Gd are controlled by the global signal (such as, the control signal EM). That is, the emission control circuit controls all of the red sub-pixels R included in the pixel group Gd, and the emission control circuit does not control the green sub-pixels G and blue sub-pixels B included in the pixel group Gd.

Summary, the driving method of the present disclosure performing grouping on the pixel circuits, thereby driving the pixel circuits included in the same pixel group based on the same desired duty cycle, where the said desired duty cycle is obtained according to an image block corresponding to the pixel group, in order to achieve the group control for the pixel circuits, as such light emitting elements included in the most of the pixel groups can operate at the better efficiency points.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving method, comprising:

dividing an input image into a plurality of image blocks; and controlling a plurality of pixel groups corresponding to the image blocks, respectively, and wherein step of controlling a corresponding one of the pixel groups corresponding to one of the image blocks comprises:

utilizing a lookup table to map a plurality of input grayscale values comprised in the one of the image blocks to a plurality of duty cycles, wherein the lookup table comprises a first duty cycle set corresponding to different red grayscale values, a second duty cycle set corresponding to different green grayscale values, and a third duty cycle set corresponding to different blue grayscale values, and the first duty cycle set, the second duty cycle set, and the third duty cycle set define different grayscale-to-duty-cycle mapping relationships with respect to each other, wherein a plurality of red grayscale values, a plurality of green grayscale values, and a plurality of blue grayscale values comprised in the input grayscale values are mapped to a plurality of first duty cycles, a plurality of second duty cycles, and a plurality of third duty cycles according to the first duty cycle set, the second duty cycle set, and the third duty cycle set, respectively;

determining one of the first duty cycles, the second duty cycles, and the third duty cycles as a desired duty cycle;

mapping the plurality of the input grayscale values to a plurality of data voltages according to the desired duty cycle; and driving a plurality of pixel circuits included in the corresponding one of the pixel groups according to the desired duty cycle and the data voltages.

2. The driving method of claim 1, wherein step of determining the one of the first duty cycles, the second duty cycles, and the third duty cycles as the desired duty cycle comprises:

determining a greatest one of the first duty cycles, the second duty cycles, and the third duty cycles as the desired duty cycle.

3. The driving method of claim 1, wherein step of driving the pixel circuits included in the corresponding one of the pixel groups according to the desired duty cycle and the data voltages comprises:

controlling a pulse width of each of a plurality of driving currents provided to a plurality of light emitting elements, by the pixel circuits, according to the desired duty cycle, and controlling a pulse amplitude of each of the driving currents, by the pixel circuits, according to the data voltages.

4. The driving method of claim 1, wherein pulse widths of a plurality of driving currents provided by the pixel circuits comprised in the corresponding one of the pixel groups are the same to each other.

5. The driving method of claim 4, wherein the pixel circuits corresponding to a plurality of red sub-pixels.

6. The driving method of claim 4, wherein the pixel circuits corresponding to a plurality of red sub-pixels and a plurality of blue sub-pixels.

7. The driving method of claim 4, wherein the pixel circuits corresponding to a plurality of red sub-pixels, a plurality of green sub-pixels, and a plurality of blue sub-pixels.

8. The driving method of claim 1, wherein each of the pixel groups comprises at least two pixels, and wherein each of the at least two pixels comprises a plurality of sub-pixels.

9. A display device, comprising:

a memory, configured to store data and instructions;

a processing circuit, coupled to the memory to access the data and the instructions, configured to:

divide an input image into a plurality of image blocks; and control a plurality of pixel groups corresponding to the image blocks, respectively, and wherein step of controlling a corresponding one of the pixel groups corresponding to one of the image blocks comprises:

utilize a lookup table to map a plurality of input grayscale values comprised in the one of the image blocks to a plurality of duty cycles, wherein the lookup table comprises a first duty cycle set corresponding to different red grayscale values, a second duty cycle set corresponding to different green grayscale values, and a third duty cycle set corresponding to different blue grayscale values, and the first duty cycle set, the second duty cycle set, and the third duty cycle set define different grayscale-to-duty-cycle mapping relationships with respect to each other, wherein a plurality of red grayscale values, a plurality of green grayscale values, and a plurality of blue grayscale values comprised in the input grayscale values are mapped to a plurality of first duty cycles, a plurality of second duty cycles, and a plurality of third duty cycles according to the first duty cycle set, the second duty cycle set, and the third duty cycle set, respectively;

determine one of the first duty cycles as a desired duty cycle;

map a plurality of the input grayscale values, the second duty cycles, and the third duty cycles to a plurality of data voltages according to the desired duty cycle; and a display panel, coupled to the processing circuit, configured to drive a plurality of pixel circuits included in the corresponding one of the pixel groups according to the desired duty cycle and the data voltages.

10. The display device of claim 9, wherein the processing circuit is further configured to:

determine a greatest one of the first duty cycles, the second duty cycles, and the third duty cycles as the desired duty cycle.

11. The display device of claim 9, wherein the processing circuit is further configured to control a pulse width of each of a plurality of driving currents provided to a plurality of light emitting elements, by the pixel circuits, according to the desired duty cycle, and controlling a pulse amplitude of each of the driving currents, by the pixel circuits, according to the data voltages.

* * * * *